United States Patent
Akiyoshi et al.

(10) Patent No.: US 9,942,821 B2
(45) Date of Patent: *Apr. 10, 2018

(54) WIRELESS COMMUNICATION TERMINAL, COMMUNICATION SYSTEM, CONTROL APPARATUS, COMMUNICATION METHOD AND PROGRAM

(71) Applicants: Ippei Akiyoshi, Tokyo (JP); Yasuhiro Mizukoshi, Tokyo (JP); Nobuhiko Itoh, Tokyo (JP)

(72) Inventors: Ippei Akiyoshi, Tokyo (JP); Yasuhiro Mizukoshi, Tokyo (JP); Nobuhiko Itoh, Tokyo (JP)

(73) Assignee: NEC Corporation, Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 14/377,151

(22) PCT Filed: Nov. 5, 2012

(86) PCT No.: PCT/JP2012/007063
§ 371 (c)(1),
(2) Date: Aug. 6, 2014

(87) PCT Pub. No.: WO2013/118209
PCT Pub. Date: Aug. 15, 2013

(65) Prior Publication Data
US 2015/0003417 A1 Jan. 1, 2015

(30) Foreign Application Priority Data
Feb. 7, 2012 (JP) ................................ 2012-023810

(51) Int. Cl.
*H04W 4/00* (2009.01)
*H04W 36/36* (2009.01)
(Continued)

(52) U.S. Cl.
CPC .......... *H04W 36/36* (2013.01); *H04W 28/12* (2013.01); *H04W 48/18* (2013.01); *H04W 12/06* (2013.01);
(Continued)

(58) Field of Classification Search
CPC ..... H04W 56/00; H04W 72/04; H04W 52/04; H04W 24/00
(Continued)

(56) References Cited

U.S. PATENT DOCUMENTS 7,184,765 B1    2/2007  Birnie et al.
7,366,524 B2    4/2008  Watanabe et al.
(Continued)

FOREIGN PATENT DOCUMENTS

EP    1079652 A1    2/2001
EP    1339250 A2    8/2003
(Continued)

OTHER PUBLICATIONS

Extended European Search Report issued by the European Patent Office for Application No. 12867923.0 dated Oct. 14, 2015 (10 pages).
(Continued)

*Primary Examiner* — Chi H Pham
*Assistant Examiner* — Alexander O Boakye
(74) *Attorney, Agent, or Firm* — Wilmer Cutler Pickering Hale and Dorr LLP

(57) ABSTRACT

The wireless communication terminal includes: a plurality of communication interfaces each of which corresponds to at least one of a plurality of wireless access systems; a first unit receiving an instruction from a prescribed control apparatus, the instruction including a wireless access system determined by the control apparatus based on a status of the wireless communication terminal, which changes along with
(Continued)

movement of the wireless communication terminal; and a second unit communicating by using a communication interface corresponding to the instructed wireless access system.

31 Claims, 19 Drawing Sheets

(51) Int. Cl.
| | |
|---|---|
| *H04W 48/18* | (2009.01) |
| *H04W 28/12* | (2009.01) |
| *H04W 36/00* | (2009.01) |
| *H04W 88/06* | (2009.01) |
| *H04W 12/06* | (2009.01) |

(52) U.S. Cl.
CPC .... *H04W 36/0038* (2013.01); *H04W 36/0055* (2013.01); *H04W 88/06* (2013.01)

(58) Field of Classification Search
USPC ....... 370/331, 392, 252, 390, 342, 338, 389; 709/223; 715/700
See application file for complete search history.

(56) References Cited

U.S. PATENT DOCUMENTS

| | | | |
|---|---|---|---|
| 8,717,931 B2 | 5/2014 | Taniuchi et al. | |
| 2003/0148777 A1 | 8/2003 | Watanabe et al. | |
| 2006/0187858 A1 | 8/2006 | Kenichi et al. | |
| 2007/0202915 A1* | 8/2007 | Karaoguz ............. H04W 8/183 | |
| | | | 455/550.1 |
| 2009/0059829 A1 | 3/2009 | Bachmann et al. | |
| 2009/0258649 A1 | 10/2009 | Salowey | |
| 2009/0286526 A1* | 11/2009 | Matsunaga ........... H04W 24/00 | |
| | | | 455/421 |
| 2010/0103829 A1 | 4/2010 | Murzeau et al. | |
| 2010/0165947 A1 | 6/2010 | Taniuchi et al. | |
| 2011/0195743 A1 | 8/2011 | Jee et al. | |
| 2012/0147777 A1* | 6/2012 | Arashin ................ H04W 72/02 | |
| | | | 370/252 |
| 2012/0149398 A1 | 6/2012 | Salowey | |
| 2012/0276904 A1 | 11/2012 | Bachmann et al. | |

FOREIGN PATENT DOCUMENTS

| | | |
|---|---|---|
| EP | 1526752 A2 | 4/2005 |
| EP | 1841142 A1 | 10/2007 |
| EP | 1912459 A1 | 4/2008 |
| JP | 2001-103575 A | 4/2001 |
| JP | 2003-284117 A | 10/2003 |
| JP | 2004-349976 A | 12/2004 |
| JP | 2005-057551 A1 | 3/2005 |
| JP | 2008-258666 A | 10/2008 |
| JP | 4703657 B2 | 3/2011 |
| WO | WO-2008-096702 A1 | 8/2008 |
| WO | WO-2010/147527 A1 | 12/2010 |
| WO | WO-2011/162215 A1 | 12/2011 |

OTHER PUBLICATIONS

International Search Report corresponding to PCT/JP2012/007063, dated Jan. 29, 2013, 2 pages.
IBM, "IP Mobility Support", Network Working Group, Request for Comments, 2002, C. Perkins Editor, Oct. 1996, pp. 1-79.
Japanese Office Action corresponding to Japanese Application No. 2013-217718, dated Oct. 13, 2015, 7 pages.

* cited by examiner

Fig. 5

| Radio Access Technology (RAT) | SELECTION RULE | | |
|---|---|---|---|
| UTRAN | PLMN IDENTIFIER (A) (UTRAN 4-1 IDENTIFIER) | | |
| WLAN | SSID (A) (WLAN 4-3 IDENTIFIER) | SSID (B) (WLAN 4-2 IDENTIFIER) | ... |
| ... | | | |

Fig. 6

| Priority (1) | RAT | Priority (2) | SELECTION RULE |
|---|---|---|---|
| 1 | WLAN | 1 | SSID (A) (WLAN 4-3 IDENTIFIER) |
| | | 2 | SSID (B) (WLAN 4-2 IDENTIFIER) |
| 2 | UTRAN | 1 | PLMN IDENTIFIER (A) (UTRAN 4-1 IDENTIFIER) |
| ... | ... | ... | ... |

Fig. 7

| COMMUNICATION FLOW TYPE | Priority | SELECTION RULE |
|---|---|---|
| Web | 1 | WLAN |
|  | 2 | UTRAN |
| VoIP | 1 | UTRAN |
|  | 2 | WLAN |
| . . . | . . . | . . . |

Fig. 8

| LOCATION INFORMATION | RAT | | |
|---|---|---|---|
| | UTRAN | WLAN | ... |
| LOCATION (A) | UTRAN4-1 | WLAN4-2<br>WLAN4-3 | ... |
| LOCATION (B) | UTRAN4-1 | WLAN4-3<br>WLAN4-4 | ... |
| ... | ... | ... | ... |

Fig. 17

| Date | Time | Location |
|---|---|---|
| 2009/04/14 | 10:30 AM | Location(A) |
| 2009/04/14 | 11:00 AM | Location(A) |
| 2009/04/14 | 11:30 AM | Location(A) |
| ... | ... | ... |
| 2009/04/15 | 07:30 AM | Location(C) |
| 2009/04/15 | 07:35 AM | Location(D) |
| 2009/04/15 | 07:40 AM | Location(E) |
| ... | ... | ... |

Fig. 18

| Date | Time | COMMUNICATION FLOW |
|---|---|---|
| 2010/02/13 | 10:30 PM | Video Streaming |
| 2010/02/13 | 11:00 PM | Video Streaming |
| 2010/02/13 | 11:30 PM | Video Streaming |
| ... | ... | ... |
| 2010/02/15 | 10:00 AM | None |
| 2010/02/15 | 10:30 AM | None |
| 2010/02/15 | 11:00 AM | None |
| ... | ... | ... |

Fig. 19

| TERMINAL IDENTIFIER | Admission Information |
|---|---|
| TERMINAL A | Yes |
| TERMINAL B | No |
| TERMINAL C | Yes |
| ... | ... |

WIRELESS COMMUNICATION TERMINAL, COMMUNICATION SYSTEM, CONTROL APPARATUS, COMMUNICATION METHOD AND PROGRAM

CROSS-REFERENCE TO RELATED APPLICATIONS

The present application is a national stage application of International Application No. PCT/JP2012/007063 entitled "Wireless Communication Terminal, Communication System, Control Apparatus, Communication Method and Program," filed on Nov. 5, 2012, which claims the benefit of priority from Japanese Patent Application No. JP2012-023810, filed on Feb. 7, 2012, the disclosures of which are incorporated herein in their entirety by reference thereto. The present invention relates to a wireless communication terminal, a communication system, a control apparatus, a communication method and a program, and in particular, relates to a wireless communication terminal, a communication system, a control apparatus, a communication method and a program, which perform communication with a plurality of wireless (or radio) access systems (or methods).

BACKGROUND

Technical Field

In recent years, it is possible for mobile terminals to connect to multiple types of RAT (Radio Access Technology). For example, a mobile terminal can connect to multiple RATs, such as 3GPP access including UTRAN (UMTS Terrestrial Radio Access Network) or LTE (Long Term Evolution), and WLAN (Wireless Local Area Network) including 802.11g or 802.11n.

The mobile terminal communicates according to an access environment by making an appropriate change to a RAT used for communication.

With regard to handover of a mobile terminal, Patent Literature 1 (Japanese Patent No. 4703657) discloses the following technology. A server present in a network in this literature refers to location information of a mobile terminal and notifies a list of access points (AP), authentication servers, and the like, present in a prescribed geographical range, to the mobile terminal. The server notifies the list of AP, authentication servers, and the like, that are present in an area adjacent to the network area where the mobile terminal is currently, to the mobile terminal. The mobile terminal performs handover from the network area where the mobile terminal is currently located, to the adjacent area. Prior to performing handover, the mobile terminal refers to the notified list and performs authentication in advance with respect to the AP and authentication servers. By performing authentication beforehand, prior to handover, authentication when handover is performed can be omitted. Therefore, there is a description that the mobile terminal can perform handover at high speed.

PATENT LITERATURE (PTL)

[PTL 1]
Japanese Patent No. 4703657

SUMMARY

The following analysis is given by the present invention. In an environment where a mobile terminal can connect to a plurality of RATs, the following problem occurs when judging a RAT to which the mobile terminal connects.

A user of the mobile terminal can switch a RAT manually in accordance with an access environment, but performing manual operations each time the environment changes is cumbersome.

In addition, consideration can be given to having the mobile terminal hold a policy in advance related to RAT selection, but since the access environment changes from day to day, it is difficult to select a RAT to correspond with changes in access environment with a pre-set policy.

In the abovementioned Patent Literature 1, a server notifies a mobile terminal of a list of access points present in an area adjacent to a network area in which the mobile terminal is present. However, there is a problem in that, with only the list, the mobile terminal cannot judge a RAT to which it should connect.

It is an object of the present invention to provide a configuration or means that can contribute to enable a wireless communication terminal provided with multiple types of communication interface to select a more desirable communication interface.

According to a first aspect, there is provided a wireless communication terminal, comprising: a plurality of communication interfaces each of which corresponds to at least one of a plurality of wireless access systems; means (a unit) for receiving an instruction from a prescribed control apparatus, the instruction including a wireless access system determined by the control apparatus based on a status of the wireless communication terminal, which changes along with movement of the wireless communication terminal; and means (a unit) for communicating by using a communication interface corresponding to the instructed wireless access system.

According to a second aspect, there is provided a communication system comprising: a control apparatus that controls wireless access systems to which a wireless communication terminal connects; a plurality of communication interfaces each of which corresponds to at least one of the wireless access systems; means (a unit) for receiving an instruction from a prescribed control apparatus, the instruction including a wireless access system determined by the control apparatus based on a status of the wireless communication terminal, which changes along with movement of the wireless communication terminal; and means (a unit) for communicating by using a communication interface corresponding to the instructed wireless access system.

According to a third aspect, there is provided a control apparatus comprising: means (a unit) for receiving a status of a wireless communication terminal, which changes along with movement of the wireless communication terminal; means (a unit) for determining a wireless access system to which the wireless communication terminal connects, based on the received status of the wireless communication terminal; and means (a unit) for transmitting an instruction including the determined wireless access system, to the wireless communication terminal.

According to a fourth aspect, there is provided a communication method using a wireless communication terminal including a plurality of communication interfaces corresponding to at least one of a plurality of wireless access systems. The method comprises: receiving, from a prescribed control apparatus, an instruction including a wireless access system determined by the control apparatus based on a status of the wireless communication terminal, which changes along with movement of the wireless communication terminal; and communicating by using a communication interface corresponding to the instructed wireless access system. This method is associated with a particular machine known as a wireless communication terminal provided with a plurality of communication interfaces corresponding to at least one of a plurality of wireless access systems.

According to a fifth aspect, there is provided a program that executes on a wireless communication terminal including a plurality of communication interfaces corresponding to at least one of a plurality of wireless access systems. The program comprises: a process of receiving, from a prescribed control apparatus, an instruction including a wireless access system determined by the control apparatus based on a status of the wireless communication terminal, which changes along with movement of the wireless communication terminal, and a process of communicating by using a communication interface corresponding to the instructed wireless access system. This program may be recorded on a computer-readable storage medium which is non-transitory. That is, the present invention may be embodied as a computer program product.

The meritorious effects of the present invention are summarized as follows. According to the present invention a wireless communication terminal provided with multiple types of communication interface can contribute to select a more desirable communication interface.

BRIEF DESCRIPTION OF DRAWINGS

FIG. 5 is a diagram showing a configuration example of a policy DB of the control apparatus in the second exemplary embodiment.

FIG. 6 is a diagram showing a configuration example of a policy DB of the control apparatus in the second exemplary embodiment.

FIG. 7 is a diagram showing a configuration example of a policy DB of the control apparatus in the second exemplary embodiment.

FIG. 8 is a diagram showing a configuration example of a policy DB of the control apparatus in the second exemplary embodiment.

FIG. 17 is a diagram showing a configuration example of a policy DB of a control apparatus in a fifth exemplary embodiment of the present disclosure.

FIG. 18 is a diagram showing a configuration example of a policy DB of the control apparatus in the fifth exemplary embodiment.

FIG. 19 is a diagram showing a configuration example of a policy DB of a control apparatus in a sixth exemplary embodiment of the present disclosure.

PREFERRED MODES

Next, a detailed description is given of exemplary embodiments of the present disclosure, making reference to the drawings.

First Exemplary Embodiment

Figure 1:
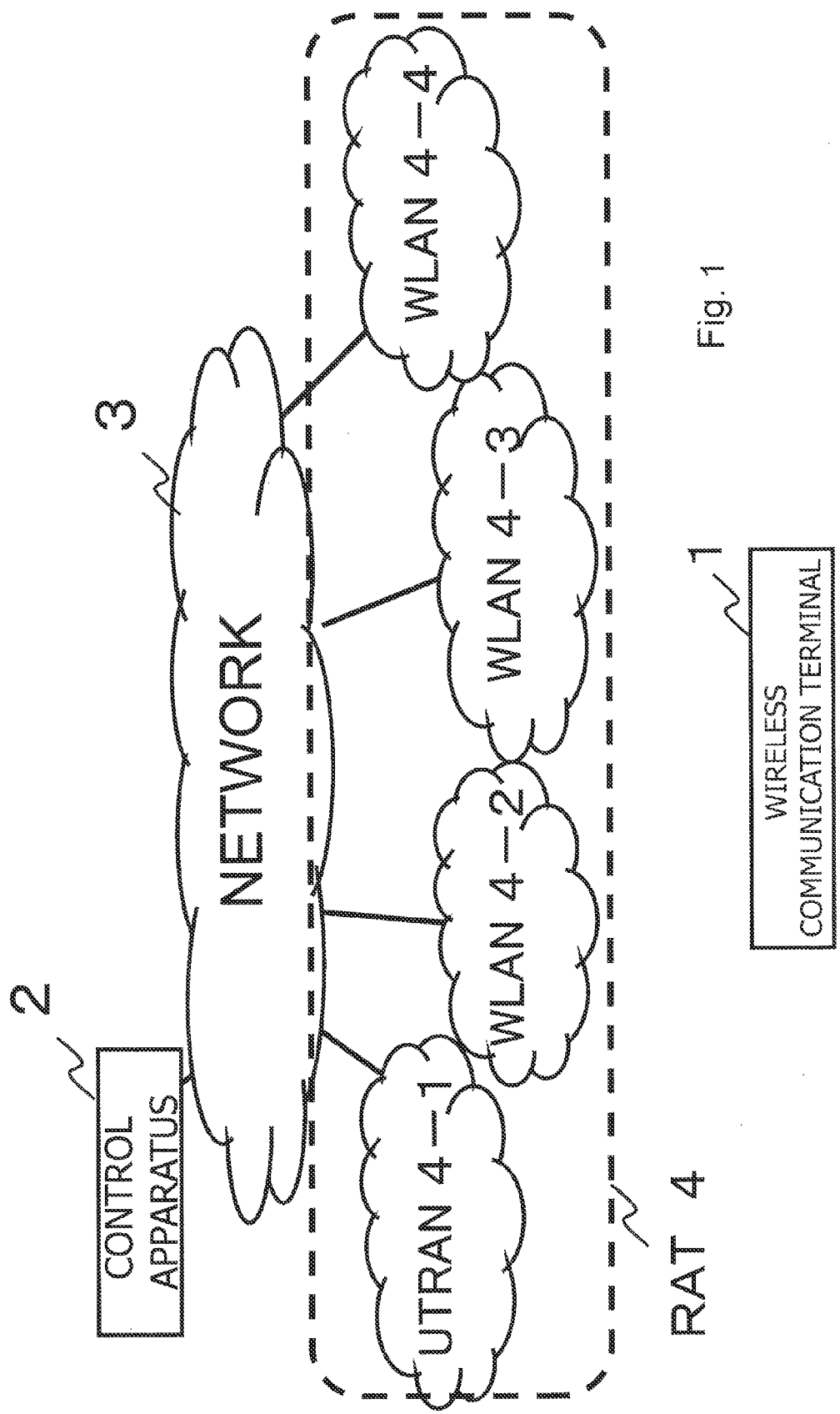
FIG. 1 is a diagram showing an example of a communication system in a first exemplary embodiment of the present disclosure.

As shown in FIG. 1, a first exemplary embodiment can be implemented by a configuration including a wireless (or radio) communication terminal 1, a control apparatus 2, a network 3, and RATs 4. It is to be noted that reference symbols in the drawing are added as examples in order facilitate understanding, and are not intended to limit the present disclosure to modes shown in the drawings.

The wireless communication terminal 1 has communication interfaces corresponding to plural wireless access systems (RAT 4 in FIG. 1). The wireless communication terminal 1 connects with any RAT (UTRAN 4-1, WLAN 4-2, WLAN 4-3, and WLAN 4-4) shown as examples in FIG. 1, to communicate with the network 3. It is to be noted that the wireless communication terminal 1 may connect with a plurality of RATs (for example, UTRAN 4-1 and WLAN 4-2), among the RATs shown as examples in FIG. 1, to communicate with the network 3.

The wireless communication terminal 1 is a device having a communication function, such as a mobile telephone, a personal computer, a mobile router, or the like. It is to be noted that the mobile router is a terminal that relays to a 3G line for mobile telephones or a wireless LAN network.

The RAT 4 is a wireless access network for the wireless communication terminal 1 to connect to the network 3. In FIG. 1, UTRAN and WLAN are shown as examples of a RAT, but RAT types in the present disclosure are not limited to the examples of FIG. 1. The RATs include, for example, wireless access networks such as LTE, WiMAX (Worldwide Interoperability for Microwave Access), and the like.

The control apparatus 2 determines a RAT to which the wireless communication terminal 1 connects, and instructs the wireless communication terminal 1 to communicate by the determined RAT. The control apparatus 2 is disposed in the network 3, for example, and the wireless communication terminal 1 connects with the RAT 4 and communicates with the control apparatus 2 via the network 3. The control apparatus 2 is an apparatus that is physically separated from the wireless communication terminal 1. It is to be noted that the location at which the control apparatus 2 is disposed is not limited to that of FIG. 1, and may be disposed in an access network on a per-RAT basis. Furthermore, the control apparatus 2 may be disposed in a data center that can communicate with the network 3.

Figure 2:
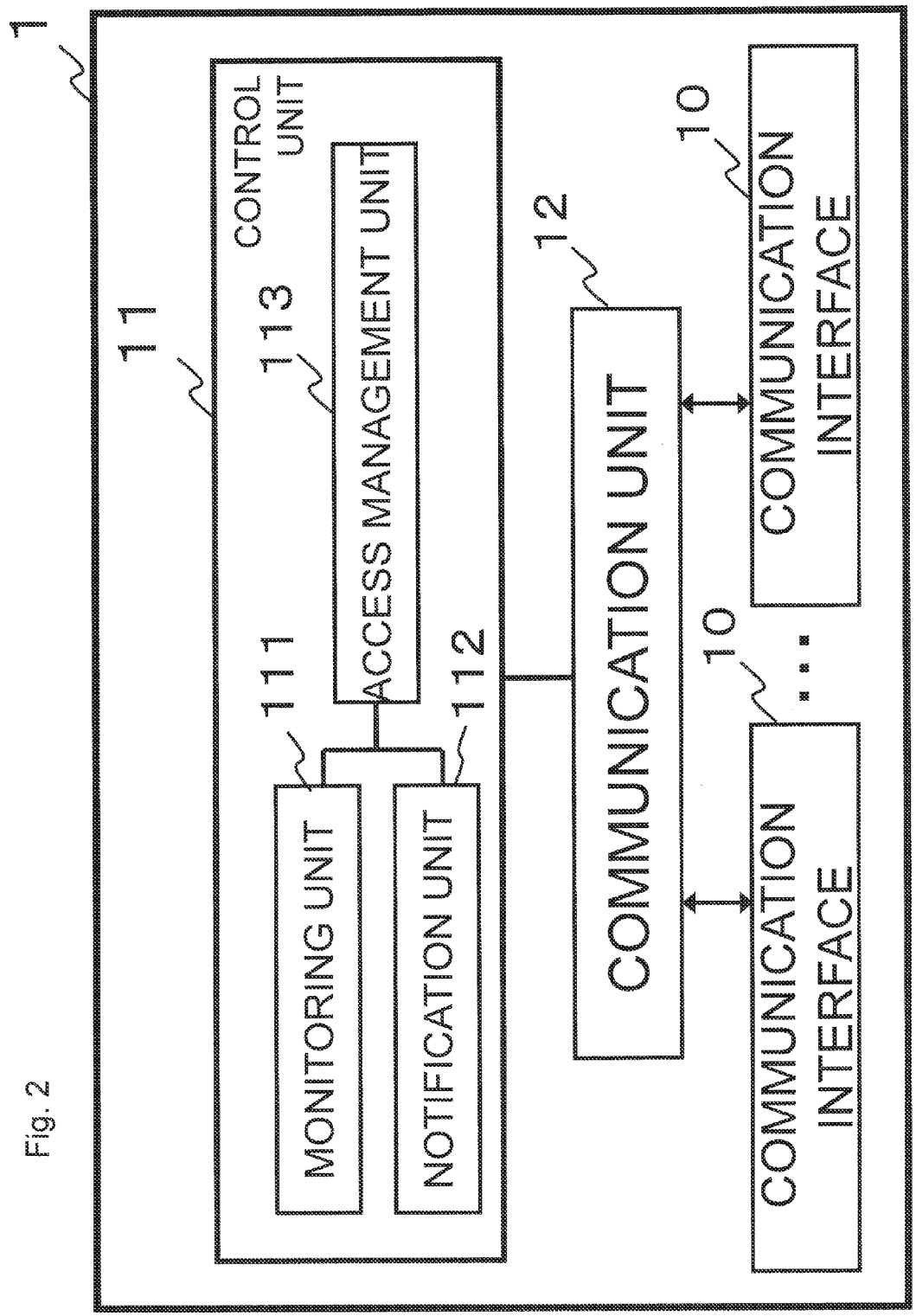
FIG. 2 is a diagram showing a configuration example of a wireless communication terminal in the first exemplary embodiment.

FIG. 2 shows a configuration example of the wireless communication terminal 1. The wireless communication terminal 1 includes a plurality of communication interfaces 10, a control unit 11, and a communication unit 12. It is to be noted that the configuration shown in FIG. 2 is an example, and the configuration of the wireless communication terminal 1 is not limited to the example of FIG. 2.

A communication interface 10 is, for example, an antenna. Each of the communication interfaces 10 corresponds to at least one of the plurality of RATs. For example, the communication interface 10 corresponds to a specific RAT (for example, UTRAN 4-1), and the wireless communication terminal 1 connects with a specific RAT (for example, UTRAN 4-1) via this communication interface 10. Furthermore, for example, the communication interface 10 corresponds to a plurality of RATs (for example, WLAN 4-2 and 4-3), and the wireless communication terminal 1 connects with any of the plurality of RATs that are corresponding, via this communication interface 10.

The control unit 11 includes a monitoring unit 111, a notification unit 112, and an access management unit 113. The monitoring unit 111 monitors a status that changes in accordance with movement of the wireless communication terminal 1. The status that changes in accordance with movement is, for example, the location of the wireless communication terminal 1, the RAT that can be used by the wireless communication terminal 1, radio wave reception strength of each communication interface, or the like. The monitoring unit 111, for example, searches for a RAT 4 that is useable around the wireless communication terminal 1, via the respective communication interfaces 10. The monitoring unit 111 searches for a useable RAT 4, via all of the communication interfaces 10. The monitoring unit 111 may search for a useable RAT 4 via an interface that is activated, among the plurality of communication interfaces. The monitoring unit 111 may search for a useable RAT via a communication interface instructed by the access management unit 113. The monitoring unit 111, for example, searches for a useable RAT 4, based on radio wave states corresponding to the respective RATs 4.

The monitoring unit 111 may measure information related to the location of the wireless communication terminal 1, or information related to the radio wave state such as radio wave reception strength or the like, via the communication interfaces 10. The information related to the location of the wireless communication terminal 1, for example, is GPS information, cell ID (the ID of a cell corresponding to a cover area of a wireless base station), or the like.

The monitoring unit 111 monitors the state of the wireless communication terminal 1 at a prescribed timing. For example, the monitoring unit 111 monitors the state of the wireless communication terminal 1 at a prescribed period. The monitoring unit 111 may monitor the state of the terminal when an instruction is given by the access management unit 113.

The monitoring unit 111 may monitor the amount of movement of the wireless communication terminal 1 at regular intervals, and may monitor the status of useable RATs only when the amount of movement is greater than or equal to a prescribed threshold. When a monitoring operation such as scanning of RAT information or the like is performed frequently, power consumption of the wireless communication terminal 1 increases. However, when the amount of movement of the wireless communication terminal 1 is small, since the probability of the state of the wireless communication terminal 1 changing is low, there is little need to frequently perform monitoring operations. Therefore, by controlling the period and frequency of monitoring operations in accordance with the amount of movement of the wireless communication terminal 1 it is possible to curtail the power consumption of the wireless communication terminal 1.

The notification unit 112 notifies the control apparatus 2, via the communication unit 12, of information related to the status of the wireless communication terminal 1 (referred to below as status information), which is monitored by the monitoring unit 111. It is to be noted that the notification unit 112 notifies the status information to the control apparatus 2 by a communication interface 10 corresponding to a RAT for which a link is established by the wireless communication terminal 1. The notification unit 112 may notify an identifier of the wireless communication terminal 1 together with the status information, to the control apparatus 2. The notification unit 112, for example, notifies, as status information, an identifier of a detected RAT or information related to radio wave state such as reception electric field strength, to the control apparatus 2. The RAT identifier, for example, is an SSID (Service Set Identifier) or PLMN (Public Land Mobile Network) identifier. The notification unit 112 may notify information related to the location of the wireless communication terminal 1 as status information to the control apparatus 2. The information related to the location of the wireless communication terminal 1, for example, is GPS information, cell ID (the ID of a cell corresponding to a cover area of a wireless base station), or the like.

The communication unit 12 transmits/receives data via the communication interface. The communication unit 12 communicates with the control apparatus 2 via the communication interface. The communication unit 12, for example, refers to a network address of the control apparatus 2 set in advance in the wireless communication terminal 1 and communicates with the control apparatus 2. The communication unit 12 is a communication line of a network operator to which the wireless communication terminal 1 is subscribed, and may obtain the address of the control apparatus 2 from the network side when connected to a RAT to which the wireless communication terminal attempts to establish a link when active. For example, when a wireless station of a RAT for which a link is established is requested to generate a logic channel (for example, a bearer), the communication unit 12 also requests the address (IP address or the like) of the control apparatus 2. The communication unit 12 may access the control apparatus 2 using a prescribed URL (Uniform Resource Locator), and may establish a VPN (Virtual Private Network) with the control apparatus 2. Methods by which the communication unit 12 communicates with the control apparatus 2 are not limited to the abovementioned method.

The control apparatus 2, for example, determines the RAT to be used by the wireless communication terminal 1, based on the status information notified by the wireless communication terminal 1. The control apparatus 2 transmits an instruction to communicate by the determined RAT to the wireless communication terminal 1.

The control apparatus 2 may determine the RAT to be used by the wireless communication terminal 1 based on information notified by another apparatus, rather than the status information notified by the wireless communication terminal 1. For example, in mobile IP technology specified by RFC 2002 or the like, the control apparatus 2 can obtain the status information of the wireless communication terminal 1 without receiving information from the wireless communication terminal 1. In a mobile IP, a home agent (HA) uses a unique address (Home Address) in the wireless communication terminal 1, and an address (Care-of Address) for specifying a movement destination network of the wireless communication terminal 1, to manage the location of the wireless communication terminal 1. The wireless communication terminal 1 connects with a foreign agent (FA) in accordance with movement, and obtains a care-of address from the FA. That is, the care-of address changes in accordance with movement of the wireless communication terminal 1. The HA receives the home address and the care-of address from the wireless communication terminal 1 or the FA, and manages the location of the wireless communication terminal 1. The control apparatus 2 may obtain the location information for the wireless communication terminal 1 from the HA, and may determine the RAT to be used by the wireless communication terminal 1, based on this location information.

The control apparatus 2 may determine the RAT to which the wireless communication terminal 1 connects, and may specify a connection device (for example, a WiFi access point or the like) for connecting to this RAT. The control apparatus 2 may instruct the wireless communication terminal 1 to connect to the specified connection device. The control apparatus 2, for example, notifies the SSID of a WiFi access point to the wireless communication terminal 1, and instructs that connection be made to the access point with this SSID.

The access management unit 113 manages connection of the communication interface 10 and the RAT 4. The access management unit 113 controls the wireless communication terminal 1 so as to communicate using the communication interface corresponding to the instructed RAT, based on the instruction from the control apparatus. 2.

It is to be noted that the control unit 11 of the wireless communication terminal 1 can also be configured by an application program. For example, the wireless communication terminal 1 may download an application program having a function corresponding to the control unit 11, from a server in the network. A server that delivers the application program to the wireless communication terminal 1, for example, is provided with a function that communicates with the wireless communication terminal 1 via the network 3 of the communication system shown in FIG. 1, and delivers an application program corresponding to the control unit 11 to the wireless communication terminal 1.

Figure 3:
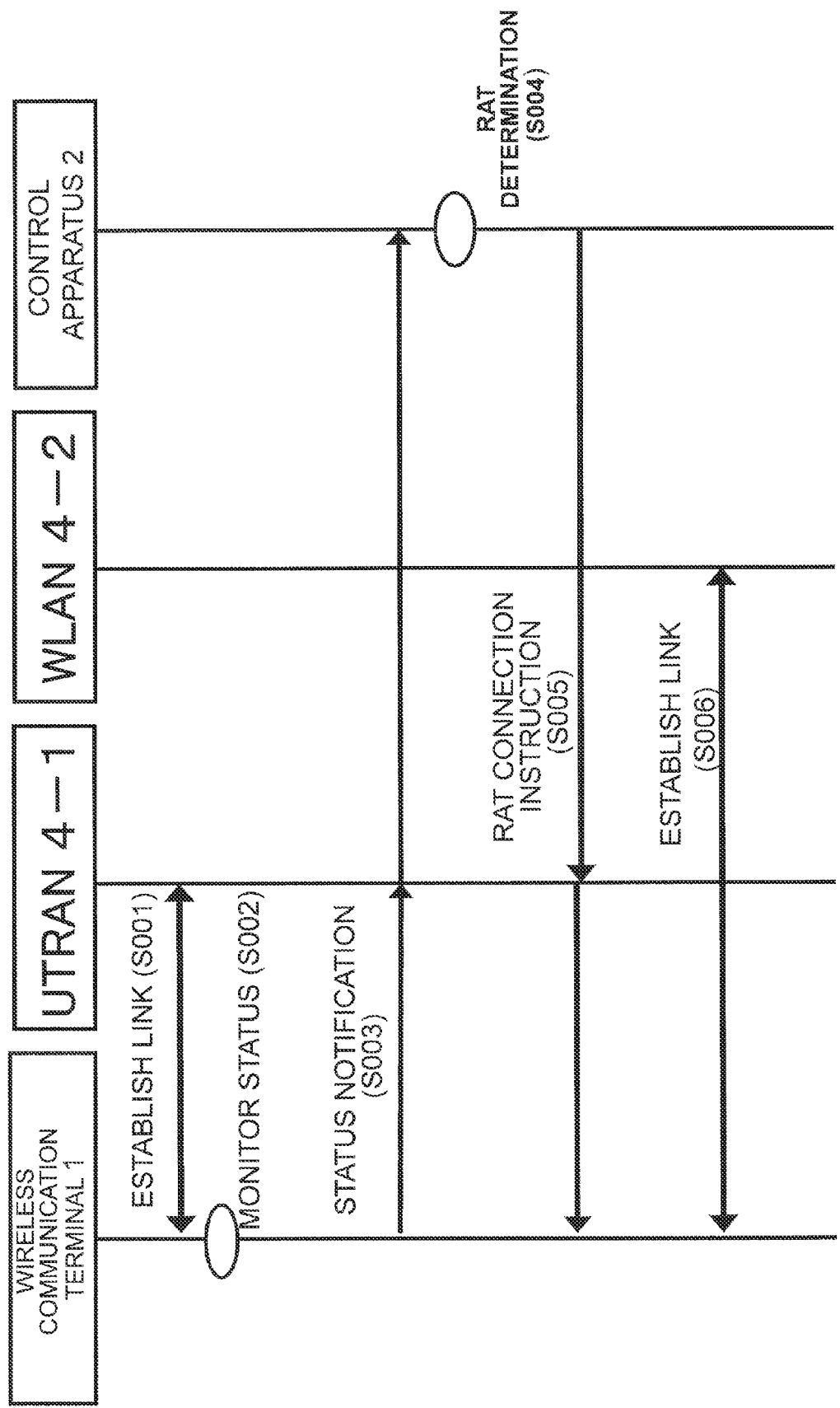
FIG. 3 is a sequence diagram showing an operational example of the first exemplary embodiment.

FIG. 3. is a sequence diagram showing an operational example of an exemplary embodiment of the present disclosure. It is to be noted that, as shown in FIG. 3, operations of the present disclosure are not limited to those of FIG. 3.

The wireless communication terminal 1 establishes a link with a prescribed RAT (for example, UTRAN 4-1) (step S001). The wireless communication terminal 1, for example, establishes the link with the prescribed RAT when operation is started (for example, when a power supply is turned on). At this occasion, the wireless communication terminal 1 establishes a link with this RAT by a communication interface 10 corresponding to the prescribed RAT. The prescribed RAT, for example, is a communication line of a network operator to which the wireless communication terminal 1 is subscribed, and is a RAT that attempts to establish a link when the wireless communication terminal 1 is activated.

The wireless communication terminal 1 monitors the state of the wireless communication terminal 1 at prescribed timing (step S002).

The wireless communication terminal 1 notifies the monitored state (status information) to the control apparatus 2 via the prescribed RAT for which a link has already been established (step S003).

The control apparatus 2, for example, determines the RAT to be used by the wireless communication terminal 1 based on the received status information (step S004). The control apparatus 2 transmits an instruction including the determined RAT or an instruction using the determined RAT to the wireless communication terminal 1 (step S005).

The wireless communication terminal 1 establishes a link with the instructed RAT based on the instruction from the control apparatus 2, and communicates using the communication interface corresponding to that RAT (step S006).

By the configuration example shown in the abovementioned exemplary embodiment, in the present disclosure, even with a configuration that supports a plurality of RATs, the wireless communication terminal 1 can easily judge a RAT to be connected to, by following the instruction from the control apparatus 2. Since the RAT to be connected is determined following the instruction from the control apparatus 2, a user of the wireless communication terminal 1 need not perform the cumbersome task of manually selecting the RAT.

Furthermore, since the RAT to be connected to the wireless communication terminal 1 is determined based on the state of the wireless communication terminal 1, it is possible to use a more desirable RAT, a RAT corresponding to the access environment of the wireless communication terminal 1.

It is to be noted that in the present embodiment the wireless communication terminal 1 notified the status information directly to the control apparatus 2, but the method of notifying the status information to the control apparatus 2 is not limited thereto. For example, a wireless base station of a prescribed RAT (for example, UTRAN 4-1) may receive radio wave reception strength from an adjacent wireless base station monitored via a corresponding communication interface by the wireless communication terminal 1, from the wireless communication terminal 1, and may notify the received information to the control apparatus 2.

Second Exemplary Embodiment

Next, a description is given of a second exemplary embodiment of the present disclosure, making reference to the drawings. A configuration example of a communication system of the second exemplary embodiment is similar to FIG. 1. That is, the second exemplary embodiment can be implemented by a configuration including a wireless communication terminal 1, a control apparatus 2, a network 3, and RATs 4.

In the second exemplary embodiment, a configuration of the wireless communication terminal 1 is the same as in FIG. 2. In the second exemplary embodiment, the control apparatus 2 determines a RAT based on status information that changes along with movement of the wireless communication terminal 1. With regard to the configuration otherwise, operations are the same as in the first exemplary embodiment described above, and detailed descriptions are omitted.

Figure 4:
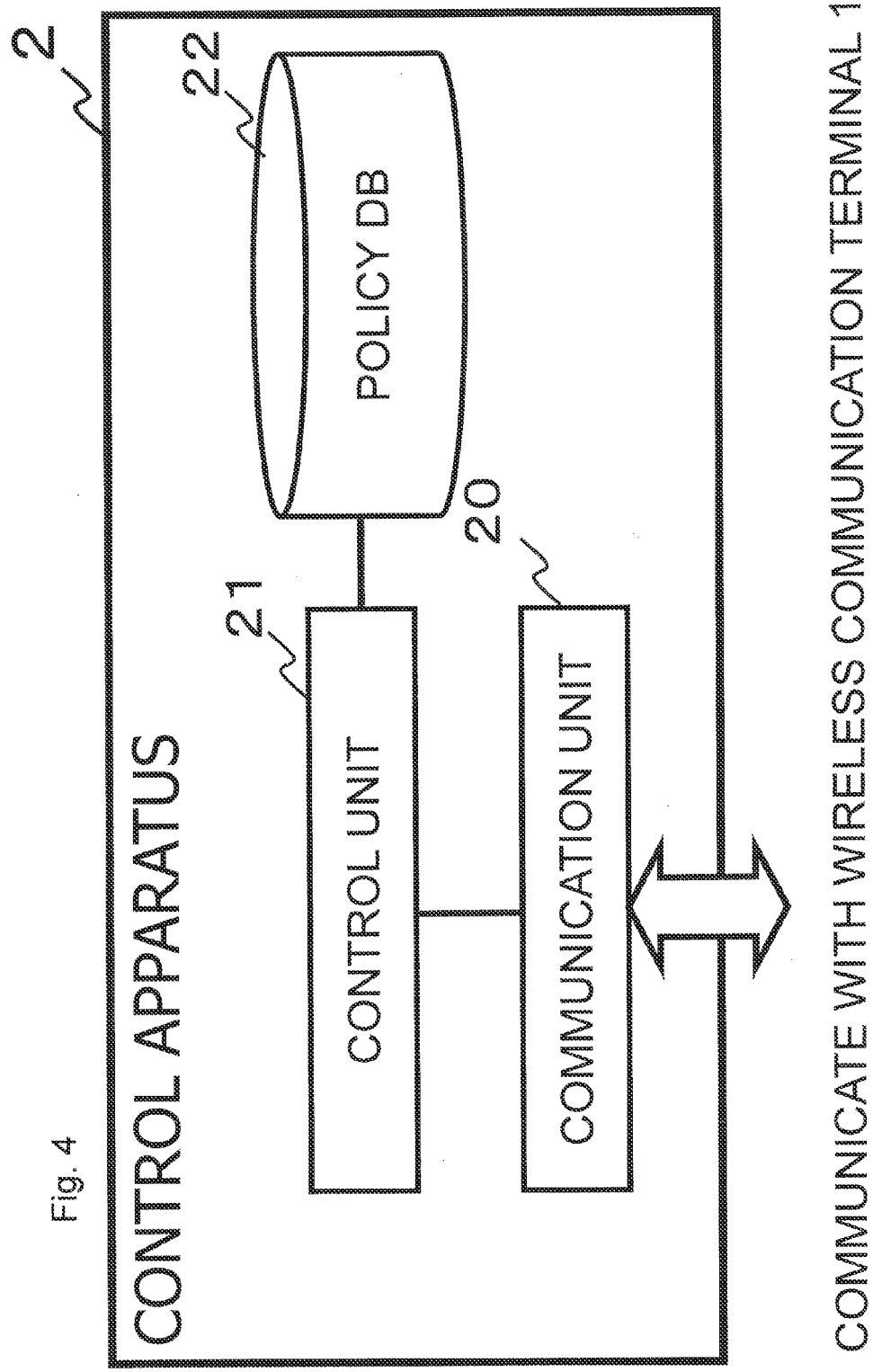
FIG. 4 is a diagram showing a configuration example of a control apparatus in a second exemplary embodiment of the present disclosure.

FIG. 4 shows a configuration of the control apparatus 2 in the second exemplary embodiment. The control apparatus 2 of the present exemplary embodiment includes a communication unit 20, a control unit 21, and a policy DB (data base) 22.

The communication unit 20 communicates with the wireless communication terminal 1. The communication unit 20, for example, receives status information transmitted from the wireless communication terminal 1. The communication unit 20 transmits an instruction to communicate by a RAT determined based on the received status information, to the wireless communication terminal 1.

The control apparatus 21, for example, determines the RAT to which the wireless communication terminal 1 connects, based on the status information received from the wireless communication terminal 1. The control unit 21 refers to the policy DB 22 to determine the RAT.

FIG. 5 shows a configuration example of the policy DB 22. It is to be noted that FIG. 5 is an example, and the configuration of the policy DB 22 is not limited to the example of FIG. 5.

In FIG. 5, the policy DB 22 has, as a rule ("selection rule" in the drawing) for determining a RAT, an identifier of a RAT to be selected, for each RAT. The policy DB 22, for example, holds data in a structure shown in FIG. 5 for each wireless communication terminal 1. The policy DB 22, for example, holds data in the structure shown in FIG. 5 for each identifier (for example, IMSI (International Mobile Subscriber Identity) and the like) of a wireless communication terminal 1.

The control apparatus 21 determines the RAT to which the wireless communication terminal 1 connects, by referring to the status information received from the wireless communication terminal 1 and the policy DB 22. The status information, for example, includes the identifier of a RAT detected by the wireless communication terminal 1. The RAT identifier, for example, is a PLMN (Public Land Mobile Network) identifier or the like, which is identification information of a UTRAN or the like.

The control unit 21, for example, searches the policy DB 22 for data corresponding to the identifier of the wireless communication terminal 1 that has transmitted the status information. The control unit 21 compares the identifier of the RAT included in the received status information, and the identifier specified in a selection rule of the policy DB 22. In a case where the identifier included in the status information matches the identifier specified in the selection rule, the control unit 21 determines the RAT corresponding to the matching identifier as the RAT to which the wireless communication terminal 1 connects. In the example of FIG. 5, in a case where the status information includes an SSID (A), which is an identifier of the WLAN 4-3 of FIG. 1, the control unit 21 instructs the wireless communication terminal 1 to connect to the WLAN 4-3.

In a case where the status information includes information related to radio wave state, such as electric field strength or the like, the control unit 21 may determine the RAT by referring to this information. In a case where an identifier included in the status information matches the identifier specified in a selection rule, for example, the control unit 21 makes a selection that has a good radio wave state, among matching identifiers.

The policy DB 22 may include priorities. FIG. 6 shows an example of a case where the policy DB 22 has priorities. It is to be noted that FIG. 6 is an example, and the configuration of the policy DB 22 is not limited to the configuration of FIG. 6. The policy DB 22, for example, has priorities with regard to RATs (access systems) and priorities for respective selection rules of each RAT (that is, for respective identifiers of each RAT). The policy DB 22 can hold a database of a structure shown in FIG. 6, for each wireless communication terminal 1.

In a case where the status information received from the wireless communication terminal 1 includes information related to a plurality of RATs, for example, the control unit 21 refers to the priorities for each of the RATs and selects a RAT with highest priority.

In a case where the status information includes a plurality of identifiers for a certain RAT, for example, the control unit 21 refers to priorities for selection rules, and selects an access network corresponding to a high priority identifier.

In the example of FIG. 6, in a case where the status information includes a UTRAN identifier and a WLAN identifier, the control unit 21 instructs the wireless communication terminal 1 to connect to the WLAN that has high priority. In a case where the status information includes SSID (B), which is an identifier of a WLAN 4-2, and SSID (A), which is an identifier of a WLAN 4-3, the control unit 21 instructs the wireless communication terminal 1 to connect to the WLAN 4-3 that has high priority.

The control unit 21 may select the RAT in accordance with type of communication flow. FIG. 7 shows an example of the policy DB 22 in a case where the control unit 21 selects a RAT in accordance with type of communication flow. It is to be noted that FIG. 7 is an example, and the configuration of the policy DB 22 is not limited to the configuration of FIG. 7.

In the policy DB 22, RATs that are selection candidates are specified for respective types of communication flow. It is to be noted that the policy DB 22 may specify a plurality of RATs that are selection candidates for the respective types of communication flow, and may have priorities for respective RATs.

In the example of FIG. 7, in a case where it is confirmed that the wireless communication terminal 1 can connect to both UTRAN and WLAN, from the status information, the control unit 21 instructs the wireless communication terminal 1 to communicate using the WLAN for Web communication, and to communicate using the UTRAN for VoIP (Voice over IP) communication. The wireless communication terminal 1, in accordance with the instruction, communicates using a communication interface corresponding to the WLAN in Web communication, and communicates using a communication interface corresponding to UTRAN in VoIP communication. That is, the wireless communication terminal 1 switches the communication interface for each communication flow. In this case also, the policy DB 22 can hold a database of a structure of FIG. 7 for each wireless communication terminal 1.

The control unit 21 may select the RAT based on location information of the wireless communication terminal 1. FIG. 8 shows an example of the policy DB 22 in a case where the control unit 21 selects a RAT based on location information. It is to be noted that FIG. 8 is an example, and the configuration of the policy DB 22 is not limited to the configuration of FIG. 8.

The location information of FIG. 8 is, for example, GPS information or cell ID. In a case where the location information is GPS information, the location of the wireless communication terminal 1 is expressed by latitude, longitude, and altitude, for example. In a case where the location information is the cell ID, the location of the wireless communication terminal 1 is estimated from, for example, the cell ID and radio wave reception strength measured by the wireless communication terminal 1 for the cell ID in question. The control unit 21, for example, estimates how far the wireless communication terminal 1 is separated from the center of the cell by the radio wave reception strength, and estimates the location of the wireless communication terminal 1. In a case of the cell ID, the location may be estimated using a plurality of cell IDs (a set of a plurality of cell IDs and radio wave reception strengths is also possible), rather than a single cell ID (a set of a single cell ID and radio wave reception strength is also possible). In this case also, the policy DB 22 can hold a database of a structure of FIG. 8, for each wireless communication terminal 1.

In the example of FIG. 8, the policy DB 22 has a database associated with a RAT that is a candidate for connection with the wireless communication terminal 1, with respect to each location information item. For example, the policy DB 22 manages RATs that are usable by the wireless communication terminal 1, for each location information item.

For example, a WiFi access point is disposed at a prescribed location for each network operator. Therefore by obtaining information related to the disposition of the access point from the network operator in advance, the control apparatus 2 can recognize a correspondence relationship between the location information and a RAT corresponding to the access point. The wireless communication terminal 1 can use the access point of a network operator to which it is subscribed. Accordingly, by referring to subscription information between the wireless communication terminal 1 and the network operator, and to the disposition of the access point of the network operator, the control apparatus 2 can recognize a correspondence relationship between the location information and a useable RAT, for each wireless communication terminal 1, and can build the policy DB 22 shown in FIG. 8. The control apparatus 2 may obtain the information related to the network operator to which the wireless communication terminal 1 is subscribed, from the wireless communication terminal 1, or may obtain the information from the network operator.

The control unit 21 refers to the policy DB 22 to identify a RAT corresponding to the location information received from the wireless communication terminal 1. The control apparatus 21 determines the RAT to which the wireless communication terminal 1 connects, from the RAT identified based on the location information. The control unit 21, for example, may determine the RAT by a method described with reference to FIG. 6 and FIG. 7, from RAT candidates identified based on the location information (a method based on priorities and communication flows).

The control unit 21 can determine a RAT to which the wireless communication terminal 1 connects by any method described with reference to FIG. 5, FIG. 6, FIG. 7, and FIG. 8. The control unit 21 may determine a RAT by arbitrarily combining methods described with reference to FIG. 5, FIG. 6, FIG. 7, and FIG. 8.

As described above, by the control apparatus 2 determining the RAT to which the wireless communication terminal 1 connects based on the policy DB 22, it is possible to easily select the RAT in accordance with the access environment of the wireless communication terminal 1.

In addition, by the control apparatus 2 switching the RAT to which the wireless communication terminal 1 connects in accordance with a communication flow, network traffic of the wireless communication terminal 1 can be controlled by the network operator. By switching the RAT to which the wireless communication terminal 1 connects, the network operator can spread the network traffic of the wireless communication terminal 1 among a plurality of RATs. In this way, it is possible for the network operator to spread the communication amount, which is continually increasing in recent years.

Third Exemplary Embodiment

Next, a description is given of a third exemplary embodiment of the present disclosure, making reference to the drawings. In the third exemplary embodiment, configurations of a wireless communication terminal and a control apparatus are different from the exemplary embodiments described above.

The third exemplary embodiment illustrates an example where the present disclosure is implemented by improving technology known as OpenFlow, which is a centrally controlled network architecture.

Figure 9:
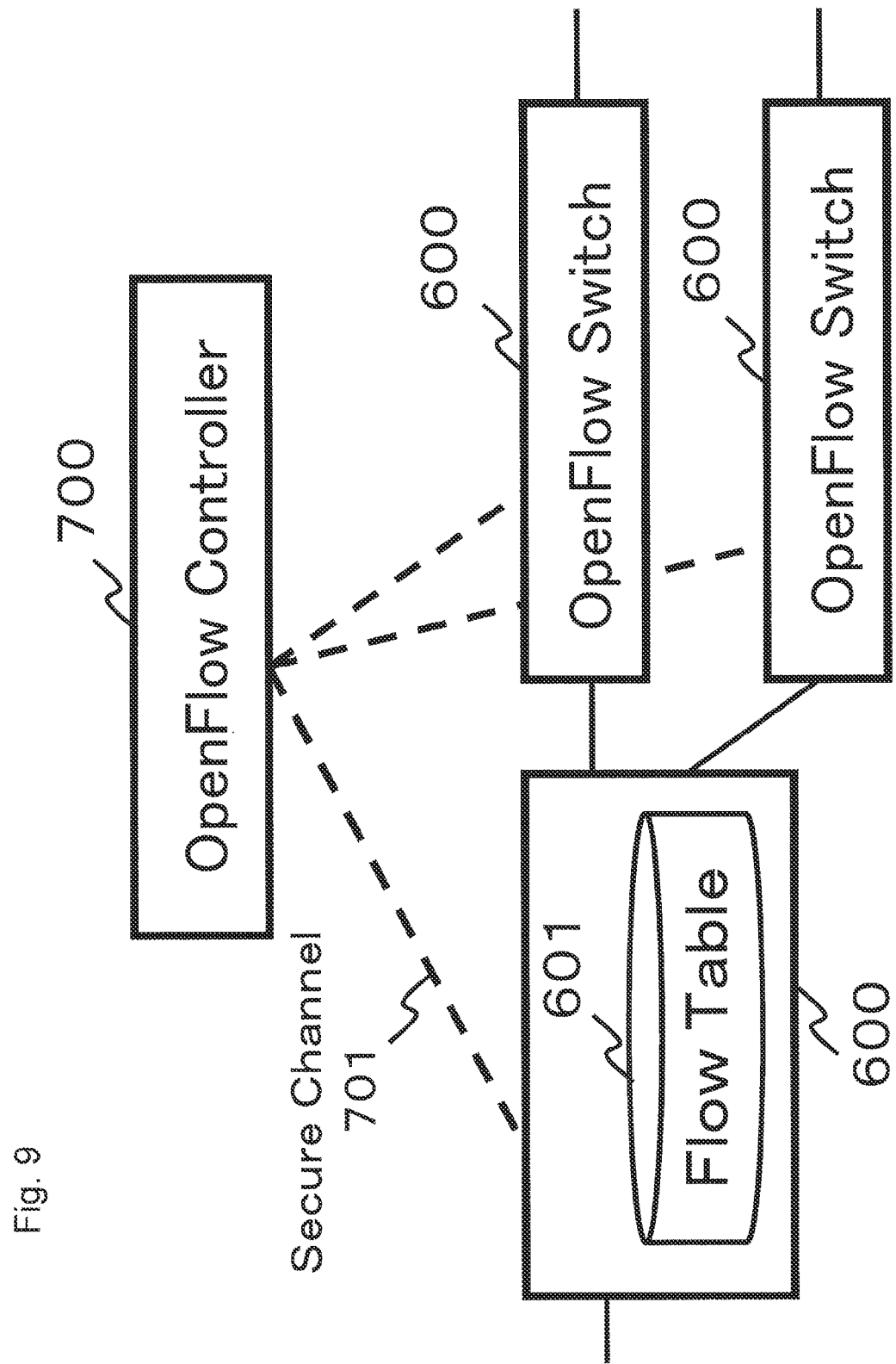
FIG. 9 is a diagram describing technology related to a third exemplary embodiment of the present disclosure.
Figure 10:
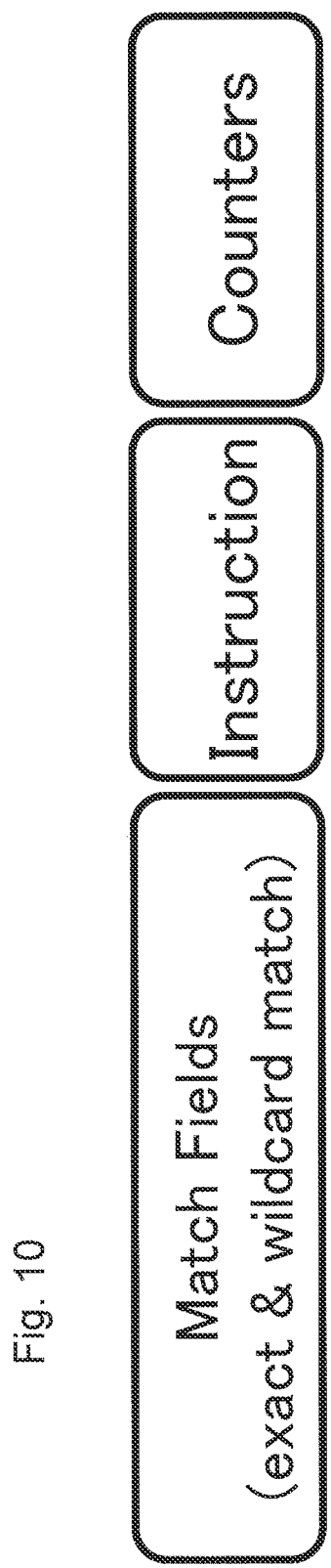
FIG. 10 is a diagram describing technology related to the third exemplary embodiment.

Referring to FIG. 9 and FIG. 10, a description is given concerning the OpenFlow technology. In OpenFlow, communication is recognized as end-to-end flow, and path control, failure recovery, and load balancing are executed in flow units. FIG. 9 shows an outline of a communication system configured by OpenFlow technology. It is to be noted that that a flow is, for example, a sequence of communication packet groups having a prescribed attribute. An OpenFlow Switch 600 is a network switch that uses the OpenFlow technology. An OpenFlow Controller 700 is an information processing device that controls the OpenFlow Switch 600.

The OpenFlow Switch 600 communicates with the OpenFlow Controller via a Secure Channel 701 provided between the OpenFlow Switch 600 and the OpenFlow Controller 700. The OpenFlow Controller 700 configures a Flow Table 601 of the OpenFlow Switch 600, via the Secure Channel 701. It is to be noted that the Secure Channel 701 is a communication path in which a measure has been taken to prevent interception or falsification of communication between a switch and a controller.

FIG. 10 shows a configuration example of respective entries (flow entries) of the Flow Table 601. A flow entry is configured by a matching rule for matching information (for example, destination IP address, VLAN ID, or the like) included in a header of a packet received by the switch, statistical information (Counters) which is statistical information for each packet flow, and Instructions that specify a processing method of a packet matching a matching rule.

On receiving a packet, the OpenFlow Switch 600 refers to the Flow Table 601. The OpenFlow Switch 600 searches for a flow entry matching the header information of a received packet. In a case where an entry matching the header information of the received packet is retrieved, the OpenFlow Switch 600 processes the received packet in accordance with a processing method defined in an instruction field of the retrieved entry. In the processing method are, for example, "received packet is forwarded from a prescribed port", "received packet is dropped", "part of header of received packet is rewritten, to be forwarded from a prescribed port", or the like.

On the other hand, in a case where an entry matching the header information of the received packet is not found, the OpenFlow Switch 600, for example, forwards the received packet to the OpenFlow Controller 700, via the Secure Channel 701. By forwarding the received packet, the OpenFlow Switch 600 requests configuration of a flow entry defining a processing method for the received packet, with respect to the controller.

The OpenFlow Controller 700 determines a processing method for the received packet, and configures a flow entry including the determined processing method in the Flow Table 601. Thereafter, the OpenFlow Switch 600 processes the received packet and subsequent packets belonging to the same flow, according to the configured flow entry.

Figure 11:
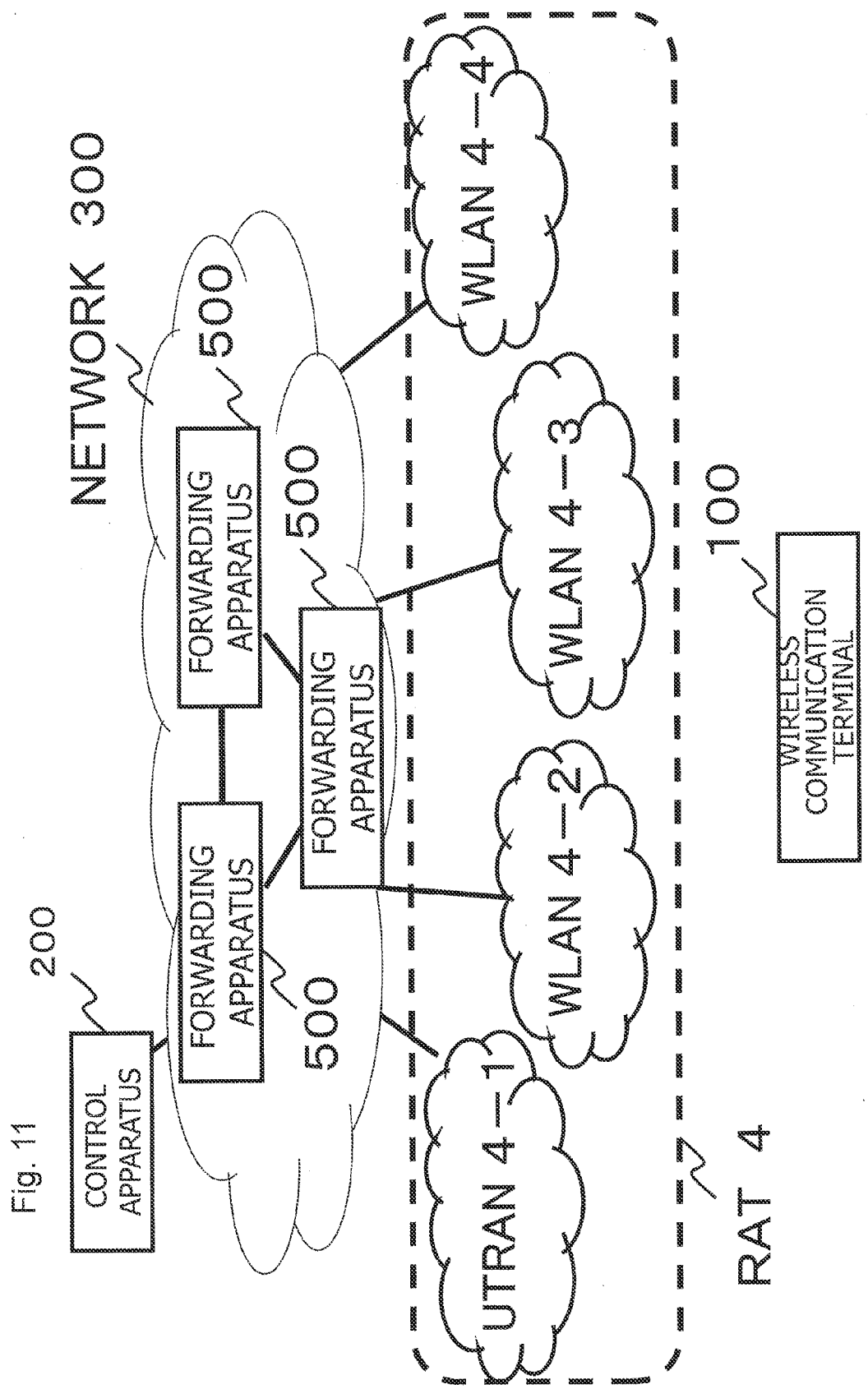
FIG. 11 is a diagram showing an example of a communication system in the third exemplary embodiment.

FIG. 11 shows an example of a communication system in the third exemplary embodiment of the present disclosure, in which the OpenFlow technology described above is improved.

A forwarding apparatus 500 includes a function of the OpenFlow Switch 600. The network 300 is a communication network including at least some of the forwarding apparatuses 500. A control apparatus 200 includes a function of the OpenFlow Controller 700.

A wireless communication terminal 100 includes a function corresponding to the OpenFlow Switch 600. It is to be noted that the function corresponding to the OpenFlow Switch 600 may be implemented by either hardware or software. The wireless communication terminal 100 is a device having a communication function, such as a mobile telephone, a personal computer, a mobile router, or the like.

Figure 12:
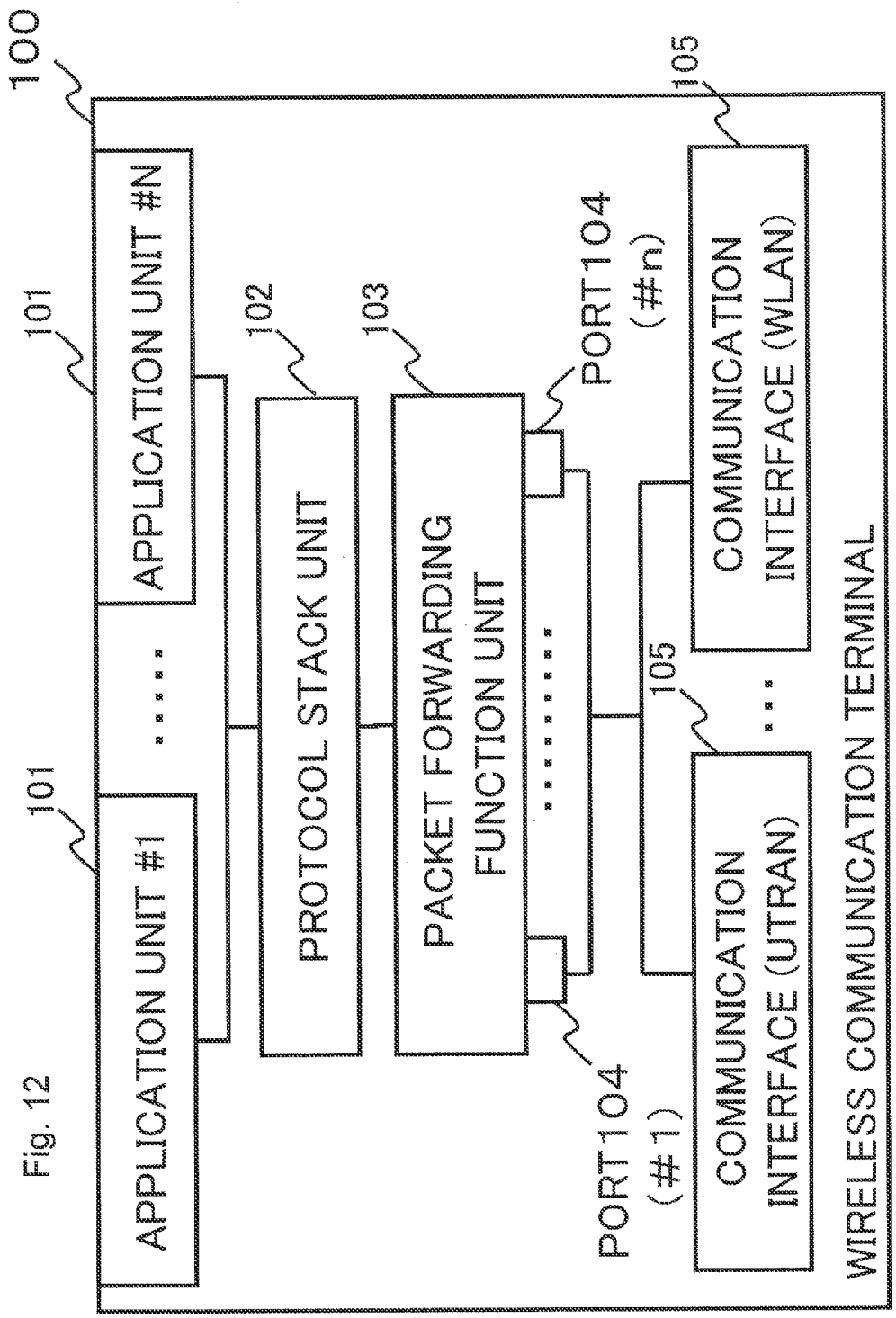
FIG. 12 is a diagram showing a configuration example of a wireless communication terminal in the third exemplary embodiment.

FIG. 12 is a diagram showing a configuration example of the wireless communication terminal 100. FIG. 12 shows a configuration including a plurality of application units #1 to #N 101, a protocol stack unit 102, a packet forwarding function unit 103, a plurality of ports 104, and a plurality of communication interfaces 105.

The packet forwarding function unit 103 includes some of the function corresponding to the OpenFlow Switch 600. The packet forwarding function unit 103 has a plurality of the ports 104. In the example of FIG. 12, the packet forwarding function unit 103 has N (N is an integer) ports 104. Each of the communication interfaces 105 is associated with at least one of the plurality of ports 104, for example. The packet forwarding function unit 103 transmits/receives data via the ports 104.

In the wireless communication terminal 1, a plurality of applications (application unit #1 to #N 101) are operating. The applications communicate with the network 300 via a RAT 4.

When an application transmits communication data to the network 300, the communication data is processed by the protocol stack unit 102 (for example, a protocol stack such as an OSI reference model), and formed into a packet to which a prescribed protocol header or the like is given. The packet is transmitted from a communication interface 105 via the packet forwarding function unit 103.

The packet forwarding function unit 103 forwards the packet from a port 104 in accordance with a packet processing rule (that is, a flow entry/packet handling operation) set by the control apparatus 200. The packet forwarded from the port 104 is transmitted to an access network of a RAT corresponding to this interface via any of the communication interfaces 105. A packet received from the access network of the RAT by the communication interface 105 is sent to an application via a port 104.

Figure 13:
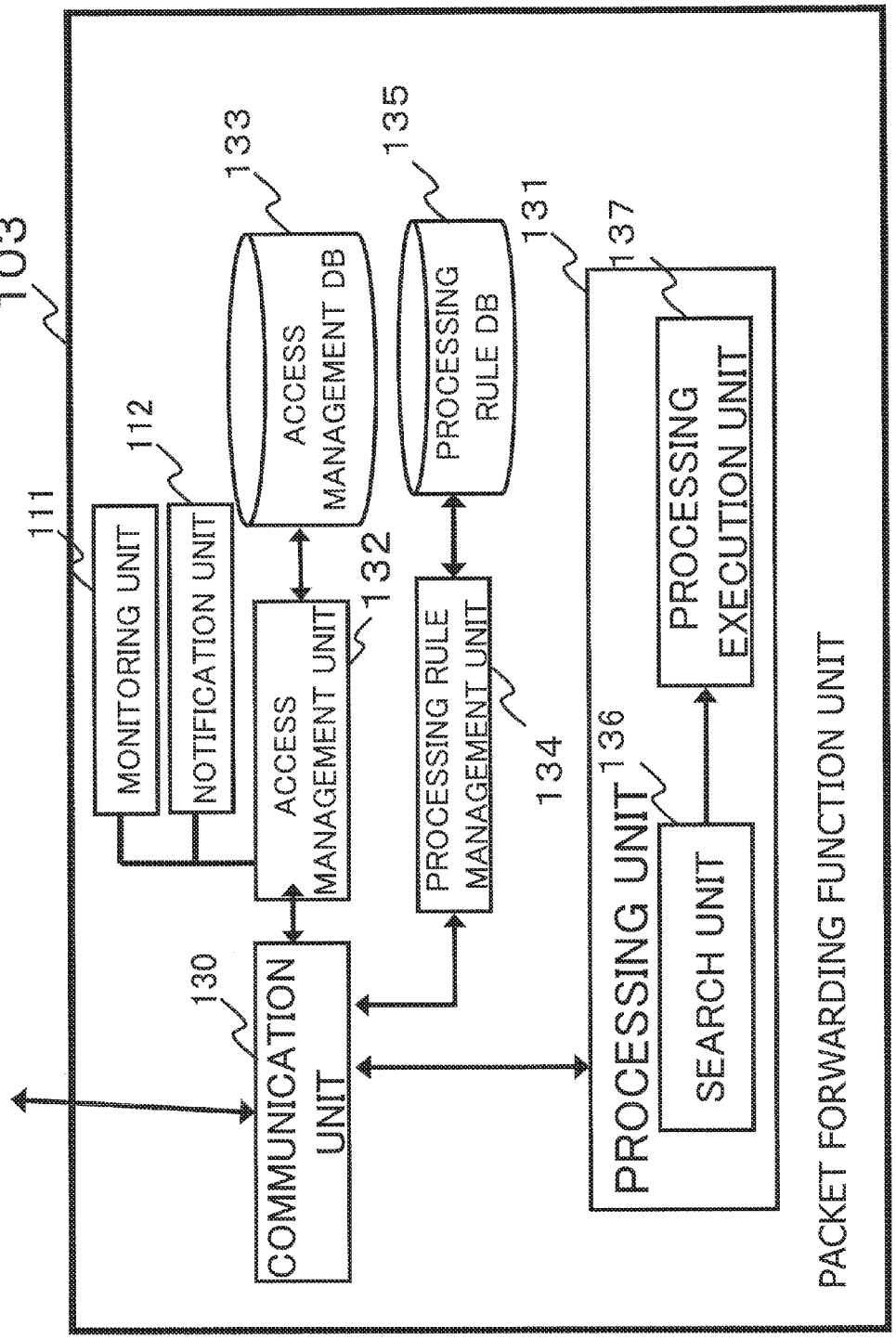
FIG. 13 is a diagram showing a configuration example of the wireless communication terminal in the third exemplary embodiment.

FIG. 13 shows a configuration example of the packet forwarding function unit 103. FIG. 13 shows a configuration including a monitoring unit 111, a notification unit 112, a communication unit 130, a processing unit 131, an access management unit 132, an access management DB 133, a processing rule management unit 134, and a processing rule DB 135.

The communication unit 130 communicates with the control apparatus 200. In order for the packet forwarding function unit 103 to receive a packet processing rule transmitted from the control apparatus 200, for example, the communication unit 130 sets a Secure Channel 701 with the control apparatus 200. The communication unit 130, for example, makes a request for a packet processing rule to the control apparatus 2, via the Secure Channel 701 that has been set.

The communication unit 130 passes the packet processing rule received from the control apparatus 2 to the processing rule management unit 134. The processing rule management unit 134 stores the packet processing rule received from the control apparatus 200 in the processing rule DB 135.

The processing unit 131 performs processing such as packet forwarding or rewriting of a packet header part in accordance with the packet processing rule that is set by the control apparatus 200. The search unit 136 searches for a packet processing rule matching the packet, among the packet processing rules stored in the processing rule DB 135. The search unit 136, for example, checks matching rules of the packet processing rules and packet content, and retrieves a processing rule including a matching rule that matches the packet content. In a case where a processing rule matching the packet is not stored in the processing rule DB 135, for example, the search unit 136 notifies the communication unit 130, and the communication unit 130 makes a request for a packet processing rule to the control apparatus 200. It is to be noted that the configuration of the packet processing rule is the same as the configuration shown in FIG. 10.

A processing execution unit 137 processes the packet in accordance with a processing method defined in the packet processing rule retrieved by the search unit 136. For example, the processing execution unit 137 executes a process of forwarding a packet from a prescribed port 104, or a process of rewriting the packet content.

The monitoring unit 111 and the notification unit 112 have functions the same as the exemplary embodiments described above.

The access management unit 113 manages connection of the communication interface 105 and the RAT 4, using the access management DB 133. The access management DB 133, for example, holds a correspondence relationship between the communication interface 105 currently used by the wireless communication terminal 100, and a RAT to which an interface being used is connected. In a case where the communication interface being used is switched by an instruction from the control apparatus 200, the access management unit 113 updates the access management DB 133. It is to be noted that the access management DB 133 may also manage information of a connection point (for example, a WiFi access point or the like) of a RAT to which the communication interface is connected.

As described above, each of the communication interfaces 105 is associated with at least one of the plurality of ports 104. Therefore, the access management unit 113 manages connection relationships between the communication interfaces 105 and the ports 104, using the access management DB 113. The access management DB 133 holds correspondence relationships between the communication interfaces 105 and the ports 104. The access management DB 133 may hold correspondence relationships between the communication interfaces 105 currently being used and the ports corresponding with those interfaces. In a case where the access management unit 113 switches the communication interface being used by an instruction from the control apparatus 200, the port being used by the packet forwarding function unit 103 is also changed. Accompanying the switching of the communication interface, in a case where the port being used by the packet forwarding function unit 103 changes, the access management unit 113 updates the access management DB 133. It is to be noted that the access management DB 133 may manage correspondence relationships between ports and connection points of a RAT to which the communication interface is connected.

The access management unit 113 refers to the access management DB 133 and transmits correspondence relationships between the ports 104 and the communication interfaces 105, and the port 104 being used, to the control apparatus 200. The port 104 being used is a port 104 corresponding to the communication interface 105 being used by the wireless communication terminal 100. The control apparatus 200 comprehends a characteristic of the port 104 and the usage state of the port 104, by receiving this information. The access management unit 113 transmits this information, for example, in a case of a request being made by the control apparatus 200.

The OpenFlow technology described above has a function (Port Status) that notifies a port state of a switch to a controller, and a function (Feature Request/Reply) that notifies a switch characteristic to the controller. In a case of notifying correspondence relationships between the ports 104 and the communication interfaces 105, and status information, or the like, to the control apparatus 200, the access management unit 113 and the notification unit 112 may use these functions.

The wireless communication terminal 100 may be provided with a function to download a program module having a function equivalent to the packet forwarding function unit 103. The wireless communication terminal 100 may use the downloaded program module as the packet forwarding function unit 103.

The forwarding apparatus 500 that forwards a packet by the network 300, outside of the monitoring unit 111, the notification unit 112, the access management unit 132, and the access management DB 133, has a configuration the same as the packet forwarding function unit 103 of the wireless communication terminal 100 described above. The forwarding apparatus 500 processes a packet passing through the network 300 in accordance with a packet processing rule that is set by the control apparatus 200.

Figure 14:
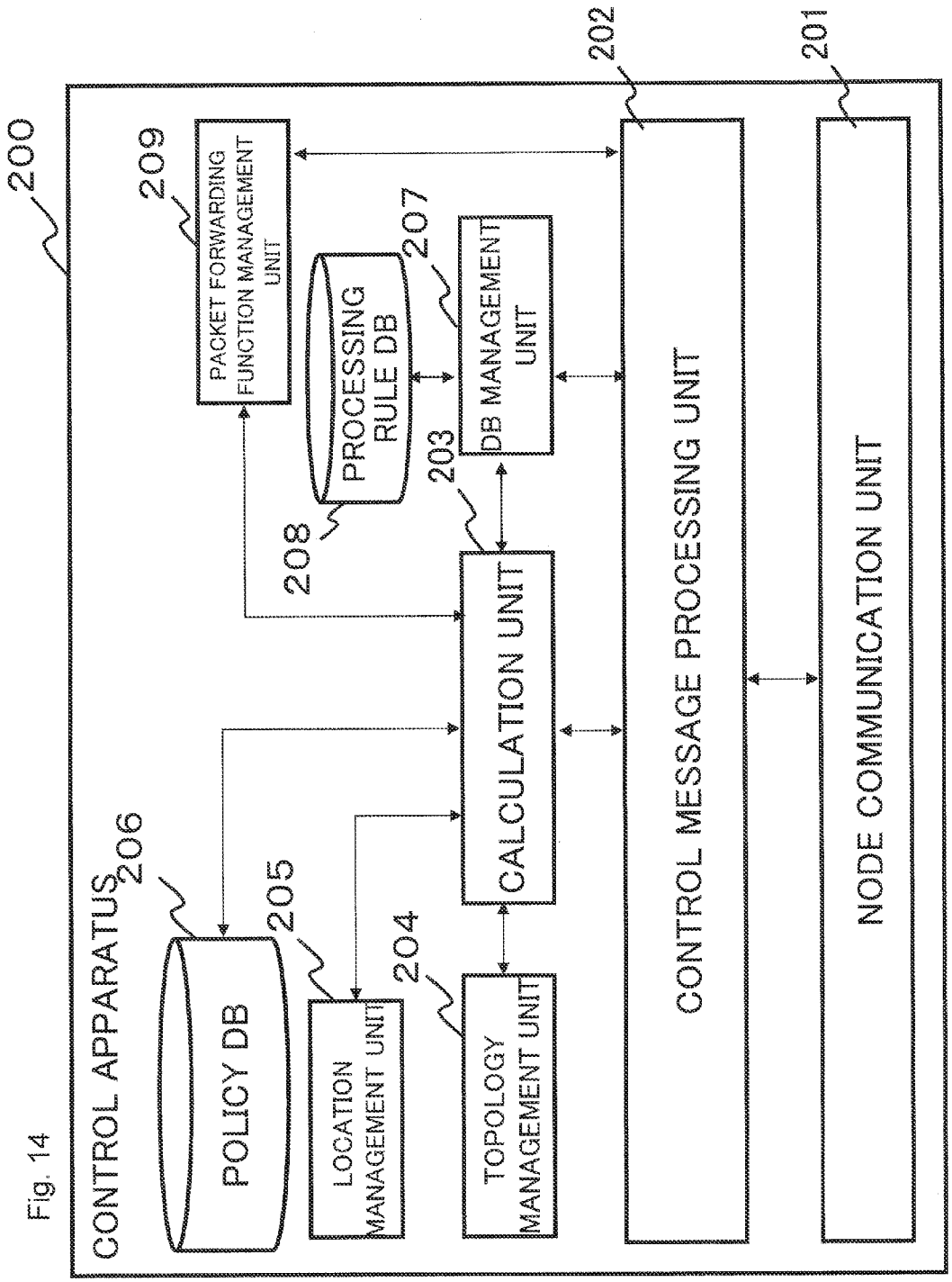
FIG. 14 is a diagram showing a configuration example of a control apparatus in the third exemplary embodiment.

FIG. 14 shows a configuration example of the control apparatus 200. Referring to FIG. 14, a configuration is shown that includes a node communication unit 201, a control message processing unit 202, a calculation unit 203, a topology management unit 204, a location management unit 205, a policy DB 206, a DB management unit 207, a processing rule DB 208, and a packet forwarding function management unit 209. It is to be noted that FIG. 14 is an example, and the configuration of the control apparatus 200 is not limited to FIG. 14.

The processing rule DB 208 stores a packet processing rule for setting the wireless communication terminal 100 and the forwarding apparatus 500. It is to be noted that the configuration of the packet processing rule is the same as the configuration shown in FIG. 10.

The node communication unit 201 communicates with the wireless communication terminal 100 and the forwarding apparatus 500. The node communication unit 201 forwards status information received from the notification unit 112 of the wireless communication terminal 100, to the calculation unit 203.

The topology management unit 204 manages network topology of the network 300, based on connection relationships of the forwarding apparatuses 500 collected via the node communication unit 201.

The location management unit 205 manages the location of the wireless communication terminal 100 in the network topology of the network 300.

The packet forwarding function management unit 209 manages information (for example, correspondence relationships of the ports 104 and the communication interfaces 105, or the port 104 that is being used by the wireless communication terminal 100) transmitted from the access management unit 113 of the wireless communication terminal 100. By the packet forwarding function management unit 209, the control apparatus 200 comprehends the state of the communication interfaces 105 and the ports 104.

The calculation unit 203 determines a packet forwarding path based on the network topology and packet processing executed by the forwarding apparatuses 500 in the forwarding path. That is, the calculation unit 203 calculates the packet forwarding path and determines a packet processing rule corresponding to the forwarding path.

The calculation unit 203 determines a RAT to which the wireless communication terminal 100 connects, based on the policy DB 206 and status information transmitted from the wireless communication terminal 100. A method of determining the RAT by the calculation unit 203 is the same as the exemplary embodiments described above. The configuration of the policy DB 206 may be the same as the configuration examples shown in FIG. 5 to FIG. 8.

The DB management unit 207 records the packet processing rule determined by the calculation unit 203 in the processing rule DB 208. The DB management unit 207 transmits the packet processing rule to the forwarding apparatus 500 and the wireless communication terminal 100 in response to a request to transmit the packet processing rule from the forwarding apparatus 500 or the wireless communication terminal 100.

The control message processing unit 202 analyzes a control message (for example, a request to set a packet processing rule, a request to determine a RAT based on status information, or the like) received from the forwarding apparatus 500 or the wireless communication terminal 100, and performs processing corresponding to the control message. The control message processing unit 202 generates a message (for example, a message for setting a packet processing rule, or the like) to be transmitted to the forwarding apparatus 500 or the wireless communication terminal 100. The control message processing unit 202 transmits an instruction to connect with a RAT determined by the calculation unit 203, to the wireless communication terminal 100.

In order to instruct the wireless communication terminal 100 to connect to the determined RAT, the calculation unit 203 may use a message that changes a correspondence relationship between the communication interface 105 and the port 104. The calculation unit 203 refers to the packet forwarding function management unit 209, comprehends the correspondence relationship between the communication interface 105 and the port 104, and generates a message changing this correspondence relationship. The control message processing unit 202 transmits this message to the wireless communication terminal 100. The wireless communication terminal 100 that receives the message associates the port 104 with the communication interface 105 corresponding to the RAT indicated in the message. By this action, the wireless communication terminal 100 can switch the connected RAT in accordance with an instruction from the control apparatus 200. It is to be noted that the above-mentioned OpenFlow technology has a function that transmits a message (Port Modification Message) changing the setting of a port of a switch. In a case of giving an instruction to switch the RAT to the wireless communication terminal 100, the control apparatus 200 may use this Port Modification Message.

In order to instruct the wireless communication terminal 100 to connect to the determined RAT, the calculation unit 203 may use a packet processing rule corresponding to switching of the RAT. The control message processing unit 202 transmits this packet processing rule to the wireless communication terminal 100. The calculation unit 203, for example, uses the packet processing rule when switching RAT for each communication flow. For example, the packet processing rule specifies a processing method to forward a packet belonging to a flow for Web communication, to the port 104 associated with a communication interface 105 corresponding to a WLAN.

Figure 15:
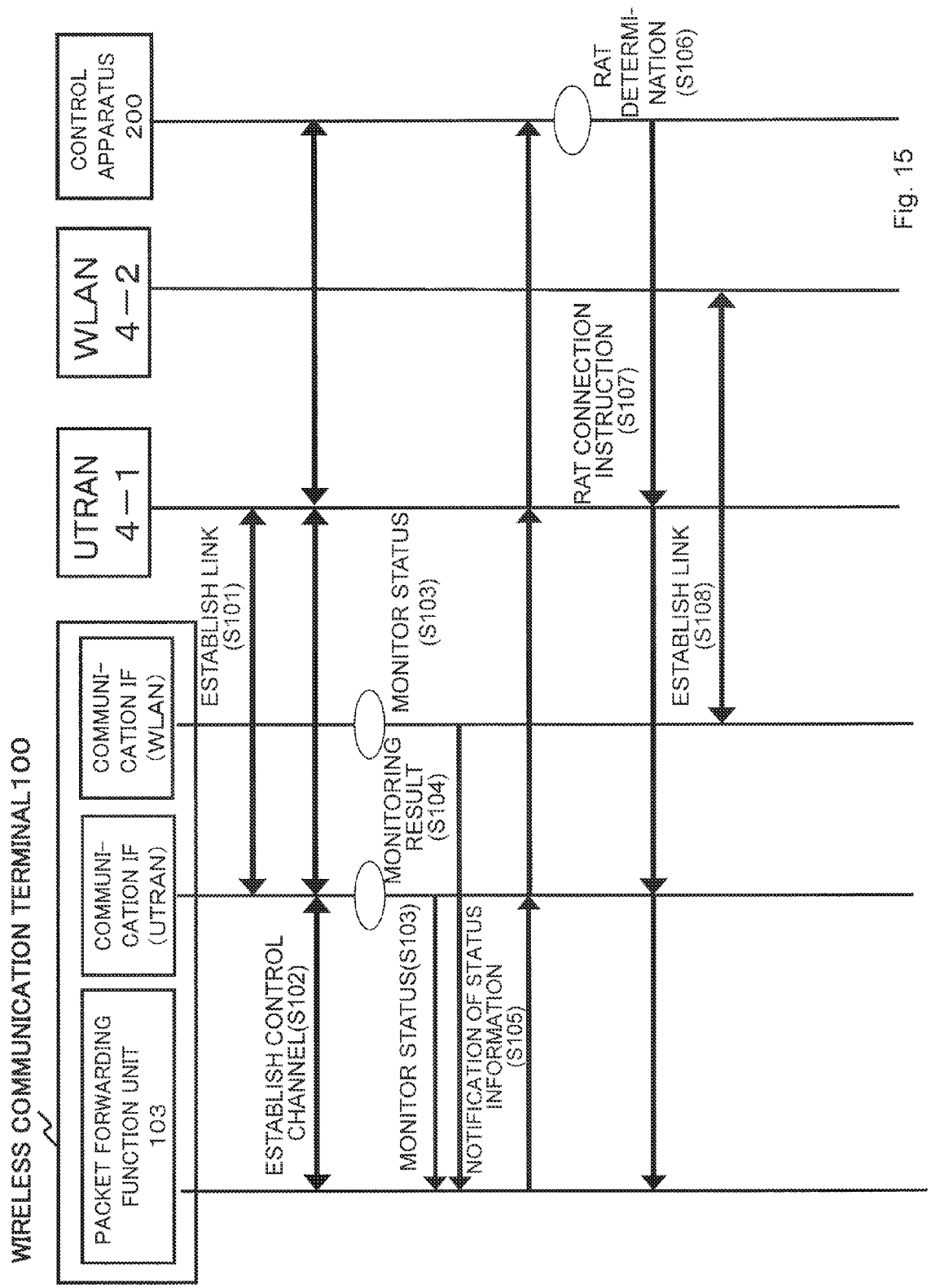
FIG. 15 is a sequence diagram showing an operational example of the third exemplary embodiment.

FIG. 15 is a sequence diagram showing an operational example of the third exemplary embodiment. FIG. 15 is an example, and operations of the present disclosure are not limited to those of FIG. 15.

Referring to FIG. 15, the packet forwarding function unit 103 of the wireless communication terminal 100 establishes a link with a prescribed RAT (for example, UTRAN 4-1) (step S101). The packet forwarding function unit 103, for example, establishes a link with the prescribed RAT when operation is started (for example, when a power supply is turned on). The wireless communication terminal 100 establishes a link with this RAT by a communication interface 105 corresponding to the prescribed RAT. The prescribed RAT, for example, is a communication line of a network operator to which the wireless communication terminal 100 is subscribed, and is a RAT that attempts to establish a link when the wireless communication terminal 100 is activated.

The packet forwarding function unit 103 sets a control channel with the control apparatus 200, via the RAT for which the link is established (step S102). The packet forwarding function unit 103 communicates with the control apparatus 200 via the control channel. The control channel, for example, is the Secure Channel 701 of the OpenFlow technology described above.

The packet forwarding function unit 103 monitors status information by using respective communication interfaces 105 (step S103). The packet forwarding function unit 103 may monitor the status information by using all of the communication interfaces 105, or may monitor the status information by using an arbitrarily selected communication interface 105. In the example of FIG. 15, the packet forwarding function unit 103 monitors a RAT that can be used by the wireless communication terminal 100, as the status information. The packet forwarding function unit 103 detects UTRAN 4-1 and WLAN 4-2, as useable RATs.

On receiving a RAT detection result, the packet forwarding function unit 103 notifies the control apparatus 200 of information related to the detected RAT as status information (monitoring result) (step S103). In the example of FIG. 15, the packet forwarding function unit 103 notifies the control apparatus 200 of information related to the UTRAN 4-1 and WLAN 4-2, as the status information.

The control apparatus 200 determines the RAT to which the wireless communication terminal 100 connects, based on the received status information (step S106), and instructs the wireless communication terminal 100 to connect to the determined RAT (step S107). In the example of FIG. 15, the control apparatus 200 determines the WLAN 4-2 as the RAT to which the wireless communication terminal 100 connects.

The packet forwarding function unit 103 switches the communication interface 105 in accordance with an instruction from the control apparatus 200 (step S108). In the example of FIG. 15, the packet forwarding function unit 103 switches from a communication interface 105 for UTRAN, to a communication interface 105 for WLAN.

As described above, according to the present exemplary embodiment, by applying the OpenFlow technology it is possible to implement detailed control using the wireless communication terminal 100 that has a simple configuration.

Fourth Exemplary Embodiment

Next, a description is given of a fourth exemplary embodiment of the present disclosure, making reference to the drawings. A communication system of the fourth exemplary embodiment is similar to examples shown in FIG. 1 and FIG. 11. Configuration examples of a wireless communication terminal and a control apparatus are similar to examples shown in FIG. 2, FIG. 4, FIG. 12, FIG. 13, and FIG. 14.

In the fourth exemplary embodiment, the wireless communication terminal activates a communication interface in accordance with an instruction from the control apparatus. The communication interface operation is stopped until being activated based on the instruction from the control apparatus.

When the communication interface monitors status information, the wireless communication terminal consumes power. Therefore, when monitoring is performing frequently, the power consumption of the wireless communication terminal increases. However, in the fourth exemplary embodiment, since operation of the communication interface is stopped until instructed by the control apparatus, it is possible to curtail excessive monitoring operations by the communication interface. Accordingly, it is possible to reduce the power consumption of the wireless communication terminal.

Figure 16:
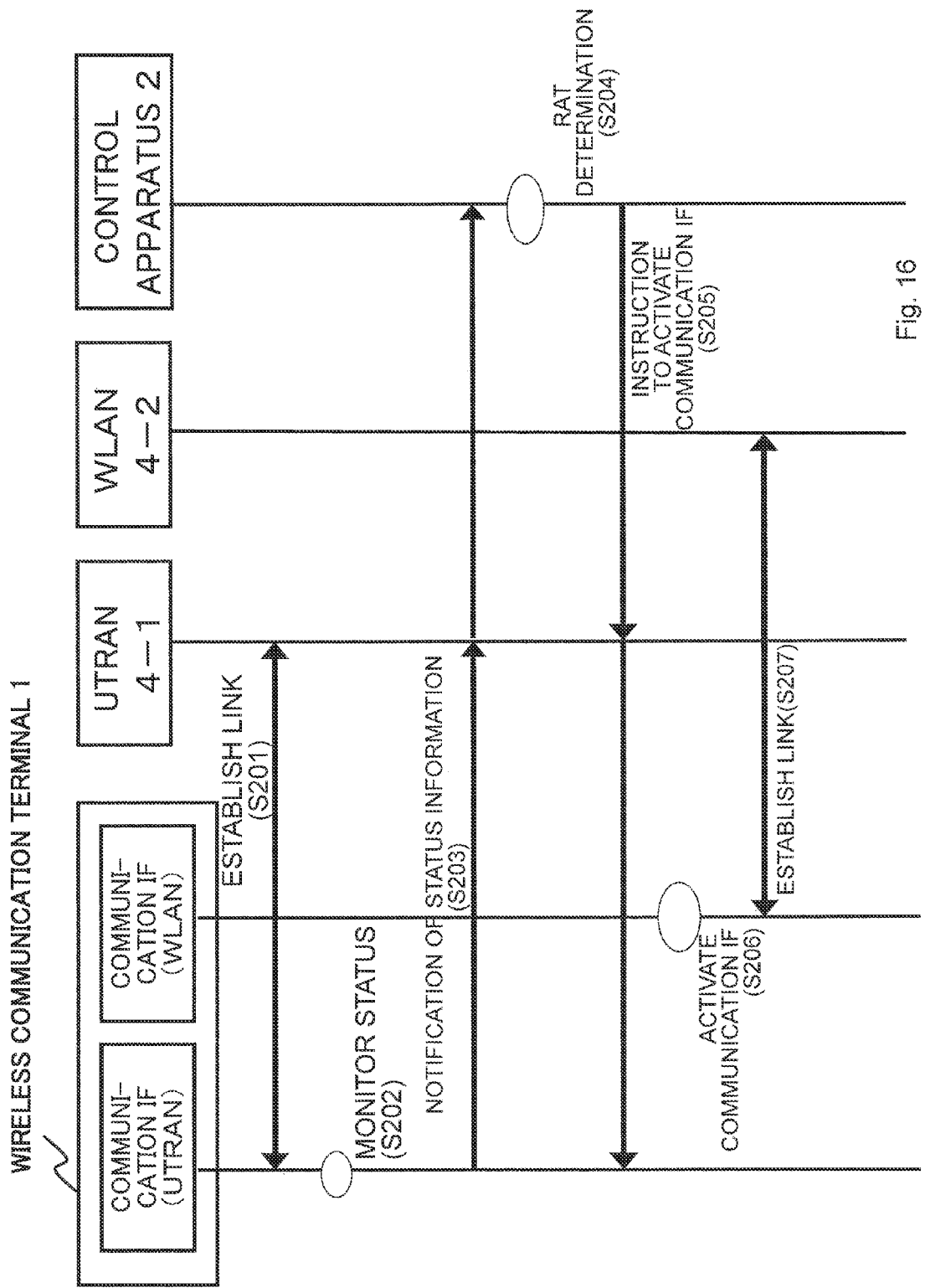
FIG. 16 is a sequence diagram showing an operational example of a fourth exemplary embodiment of the present disclosure.

Referring to FIG. 16, a description is given of the fourth exemplary embodiment. FIG. 16 is a sequence diagram showing an operational example of the fourth exemplary embodiment. It is to be noted that FIG. 16 is an example, and operations of the present disclosure are not limited to those of FIG. 16.

In FIG. 16, a description is given using the wireless communication terminal 1 shown in FIG. 2, and the control apparatus 2 shown in FIG. 4, but the wireless communication terminal 100 and the control apparatus 200 described in the third exemplary embodiment may also be used.

The wireless communication terminal 1 establishes a link with a prescribed RAT (for example, UTRAN 4-1) (step S201). The wireless communication terminal 1, for example, establishes a link with the prescribed RAT when operation is started (for example, when a power supply is turned on). The wireless communication terminal 1 establishes a link with this RAT by a communication interface 10 corresponding to the prescribed RAT. The prescribed RAT, for example, is a communication line of a network operator to which the wireless communication terminal 1 is subscribed, and is a RAT that attempts to establish a link when the wireless communication terminal 1 is activated. In FIG. 16 the prescribed RAT is an UTRAN.

As shown in FIG. 16, the communication interface 10 corresponding to the UTRAN is operating (step S202), but operation of a communication interface 10 corresponding to a WLAN is stopped. Therefore, status monitoring by the wireless communication terminal 1 is executed via the communication interface 10 corresponding to the UTRAN, but monitoring by the communication interface corresponding to the WLAN is not executed. In FIG. 16, the wireless communication terminal 1, for example, monitors information related to the location of the wireless communication terminal 1 by the communication interface 10 corresponding to the UTRAN.

The wireless communication terminal 1 notifies the control device 2 of information related to the location of the wireless communication terminal 1, as status information (step S203).

The control apparatus 2 determines a RAT to which the wireless communication terminal 1 connects, based on the received status information (step S204). The control apparatus 2, for example, determines the RAT by a method described with reference to FIG. 8. The control apparatus 2 refers to a policy DB 22 of FIG. 8, from information related to the location of the wireless communication terminal 1, and selects a RAT to which the terminal connects, from RATs that can be used by the wireless communication terminal 1. In FIG. 16, the control apparatus 2 determines the WLAN 4-2 as the RAT to which the wireless communication terminal 1 connects.

The control apparatus 2 instructs the wireless communication terminal 1 to activate the communication interface 10 corresponding to the determined RAT (step S205). An access management unit 113 of the wireless communication terminal activates the communication interface in response to the instruction received from the control apparatus 2 (step S206). The wireless communication terminal 1 activates the communication interface 10, for example, by changing an operation setting of "OFF" to "ON". The communication interface with an operation setting of "OFF" does not execute operations such as status monitoring or the like. By the operation setting being made "ON", the communication interface is activated. By the operation setting being made "ON", the communication interface can perform operations such as status monitoring or connecting with a RAT. It is to be noted that the control apparatus 2 may also instruct that operation of a communication interface not used by the wireless communication terminal 1 be stopped.

The wireless communication terminal 1 connects to a RAT by the communication interface 10 that has been activated (step S207).

According to the present exemplary embodiment as described above, in addition to effects of the abovementioned exemplary embodiments it is possible to reduce the power consumption of the wireless communication terminal. It is to be noted that when the communication interface indicated by the control apparatus 2 is activated, the wireless communication terminal 1 may stop operation of unused interfaces. In this way, it is possible to further reduce the power consumption of the wireless communication terminal 1.

Fifth Exemplary Embodiment

Next, a description is given of a fifth exemplary embodiment of the present disclosure, making reference to the drawings. A communication system of the fifth exemplary embodiment is similar to examples shown in FIG. 1 and FIG. 11. Configuration examples of a wireless communication terminal and a control apparatus are similar to examples shown in FIG. 2, FIG. 4, FIG. 12, FIG. 13, and FIG. 14.

In the fifth exemplary embodiment, a RAT to which the wireless communication terminal connects is determined based on a characteristic of the wireless communication terminal. The characteristic of the wireless communication terminal, for example, is movement history, communication history, or the like, of the wireless communication terminal. Otherwise, a characteristic of the wireless communication terminal can use something that changes along with movement of the wireless communication terminal.

Referring to FIG. 17, a description is given of an operational example where the control apparatus selects a RAT based on the movement history of the wireless communication terminal. FIG. 17 is a diagram for describing an example in which the RAT is determined based on the movement history of the wireless communication terminal. A policy DB of the control apparatus manages the movement history of the wireless communication terminal by a database of a structure exemplified in FIG. 17.

A monitoring unit 111 of the wireless communication terminal periodically monitors the movement history of the wireless communication terminal, and a notification unit 112 notifies the control apparatus of a monitoring result as status information. The control apparatus can build the database exemplified in FIG. 17 in the policy DB, based on received status information.

From the movement history shown in FIG. 17, the control apparatus, for example, can estimate the period of time for which the wireless communication terminal remains at a prescribed location. In a case where the wireless communication terminal remains at a prescribed location for a specific period of time, the control apparatus instructs the wireless communication terminal to connect to a RAT with low communication charges or a RAT with the best communication state, among usable RATs at the prescribed location where the terminal remains during the specific period of time. For example, the control apparatus estimates the period of time it remains in an area where a WiFi hotspot exists from the policy DB 22, and instructs the wireless communication terminal to attempt to connect to the WiFi hotspot in this time period. By this type of operation, the wireless communication terminal can automatically connect to an appropriate RAT.

From the movement history shown in FIG. 17, the control apparatus, for example, can estimate a time period in which the location frequently changes at short time intervals. In a case where the wireless communication terminal moves at high speed in a car or train, it is assumed that the location changes frequently at short time intervals. When a connected RAT frequently changes in accordance with change in location, it is assumed that communication is frequently cut off for the wireless communication terminal. Therefore, in a case where the location changes frequently at short time intervals, the control apparatus can select a RAT that can be continuously used even if the location changes, and it is possible to prevent communication being unnecessarily being cut off for the wireless communication terminal. For example, the control apparatus instructs the wireless communication terminal 1 to use an UTRAN with which stable communication is possible during weekday morning commuting periods.

As described above, by selecting the RAT based on the movement history of the wireless communication terminal, it is possible to provide a comfortable communication environment to the wireless communication terminal user.

Next, referring to FIG. 18, a description is given of an operational example where the control apparatus selects a RAT based on communication history of the wireless communication terminal. The policy DB of the control apparatus manages the communication history of the wireless communication terminal by a database of a structure exemplified by FIG. 18.

The monitoring unit 111 of the wireless communication terminal periodically monitors the communication history of the wireless communication terminal, and a notification unit 112 notifies the control apparatus of a monitoring result as status information. The control apparatus can build the database exemplified in FIG. 18 in the policy DB, based on received status information.

From the communication history shown in FIG. 18, the control apparatus, for example, can estimate a time period in which the wireless communication terminal communicates continuously with a large communication amount. For example, the control apparatus can estimate a time period when the wireless communication terminal continuously carries out communication of video streaming or the like.

The control apparatus, for example, selects a RAT having a wide communication band or a RAT with little congestion in a time period when the wireless communication terminal carries out a large amount of communication. In a case where the wireless communication terminal continues to carry out a large amount of communication for a prescribed period or longer, the control apparatus can select a RAT with a narrow communication band and can limit communication of the wireless communication terminal.

From the communication history shown in FIG. 18, the control apparatus, for example, can estimate a time period in which the communication amount by the wireless communication terminal is low. In the example of FIG. 18, a time period where communication flow is "None" is a time period where there is no communication by the wireless communication terminal. The control apparatus, for example, instructs the wireless communication terminal to stop operation of a communication interface corresponding to a prescribed RAT in the time period where there is little communication by the wireless communication terminal. By this action, since it is possible to curtail unnecessary operation such as an operation of scanning RATs by a communication interface, it is possible to reduce the power consumption of the wireless communication terminal.

According to the present exemplary embodiment as described above, it is possible to instruct the selection of a RAT that is appropriate to a user access environment estimated from the movement history or the communication history of the wireless communication terminal, or to control the power supply of an interface.

Sixth Exemplary Embodiment

Next, a description is given of a sixth exemplary embodiment of the present disclosure, making reference to the drawings. A communication system of the sixth exemplary embodiment is similar to examples shown in FIG. 1 and FIG. 11.

In the sixth exemplary embodiment, in a case where the consent of a user of a wireless communication terminal is obtained, a communication interface is switched in accordance with an instruction from a control apparatus 2. An assumption is also made that the communication interface specified in the instruction from the control apparatus 2 is opposed to the intention of the user of the wireless communication terminal. In the sixth exemplary embodiment, the intention of the user of the wireless communication terminal is taken into consideration to perform switching of the communication interface.

In the sixth exemplary embodiment a description is given making reference to the wireless communication terminal 1 exemplified in FIG. 2, and the control apparatus 2 exemplified in FIG. 4, but the wireless communication terminal and the control apparatus may be configured as described in the third exemplary embodiment.

FIG. 19 is a diagram showing a configuration example of a policy DB 22 of the present exemplary embodiment. The policy DB 22 stores Admission Information indicating whether or not users of respective wireless communication terminals 1 consent to switching of communication interfaces in accordance with an instruction of the control apparatus 2, for each identifier of the wireless communication terminals 1. It is to be noted that the identifiers of the wireless communication terminals 1 are, for example, IMSI (International Mobile Subscriber Identity) or the like.

The control apparatus 2, for example, obtains the Admission Information in advance from the wireless communication terminal 1. For example, a communication operator records the Admission Information in the policy DB 22, based on a subscription of the user of the wireless communication terminal 1. For example, the user of the wireless communication terminal 1 may notify the control apparatus 2 of Admission Information using the wireless communication terminal 1. The Admission Information of the policy DB 22 may be configured so as to enable change as appropriate by the user of the wireless communication terminal 1.

In a case of the user giving consent (for example, a case where the Admission Information is "Yes"), the control unit 21 of the control apparatus 2 gives an instruction of a RAT to be used, to the wireless communication terminal 1, and a communication interface is instructed to the wireless communication terminal 1. In a case of the user not giving consent (for example, a case where the Admission Information is "No"), the control unit 21 does not transmit an instruction to the wireless communication terminal 1.

An example is shown where the control apparatus 2 judges whether or not to give an instruction to the wireless communication terminal 1 based on the Admission Information. This is an example, however, and the wireless communication terminal 1 may also judge whether or not to follow an instruction received from the control apparatus 2.

For example, on receiving an instruction from the control apparatus 2, an access management unit 113 of the wireless communication terminal 1 displays a dialog for confirming the user's consent on a display of the wireless communication terminal 1. In accordance with the dialog, the user inputs whether or not the user consents to switching of communication interface. In a case where the user consents, the access management unit 113 of the wireless communication terminal 1 switches the communication interface in accordance with the instruction from the control apparatus 2.

As described above, according to the present exemplary embodiment, it is possible to implement RAT switching, giving consideration to the intention of the user.

Descriptions of the respective exemplary embodiments of the present disclosure have been given above, but the present disclosure is not limited to the abovementioned respective exemplary embodiments, and modifications, substitutions, and adjustments are possible. Furthermore, the present disclosure may be implemented by arbitrarily combining the respective exemplary embodiments. Namely, the present disclosure includes various types of transformation and modification or variation that could be conceived by a person skilled in the art, in accordance with the entire disclosure including the scope of the claims and to technical concepts thereof. Finally, preferred modes of the present disclosure are summarized.

<First Mode>
(See the wireless communication terminal according to a first aspect described above.)
<Second Mode>
The wireless communication terminal according to the first mode, wherein the communicating means (unit) activates a communication interface corresponding to the instructed wireless access system in accordance with an instruction from the control apparatus, and communicates using the activated communication interface.
<Third Mode>
The wireless communication terminal according to the first or second mode, further comprising means (unit) for notifying the control apparatus of the status of the wireless communication terminal, which changes along with movement of the wireless communication terminal.

<Fourth Mode>
The wireless communication terminal according to any one of the first to third modes, further comprising means (unit) for switching a communication interface for each communication flow, based on an instruction transmitted from the control apparatus.
<Fifth Mode>
The wireless communication terminal according to any one of the first to fourth modes, further comprising means (unit) for stopping operation of at least one communication interface, based on an instruction of the control apparatus.
<Sixth Mode>
The wireless communication terminal according to any one of the first to fifth modes, wherein the receiving means (unit) additionally receives information related to a connection apparatus for connecting by the wireless access system determined by the control apparatus, from the control apparatus; and the communicating means (unit) communicates via the connection apparatus, by the communication interface corresponding to the instructed wireless access system.
<Seventh Mode>
The wireless communication terminal according to any one of the first to sixth modes, wherein the receiving means (unit) receives an instruction from the control apparatus, the instruction including a wireless access system determined by the control apparatus based on information related to the location of the wireless communication terminal, and the communicating means (unit) communicates using a communication interface corresponding to the instructed wireless access system.
<Eighth Mode>
The wireless communication terminal according to any one of the first to seventh modes, wherein the receiving means (unit) receives an instruction including a wireless access system determined based on at least one of: movement history of the wireless communication terminal or communication history of the wireless communication terminal.
<Ninth Mode>
The wireless communication terminal according to any one of the first to eighth modes, wherein the communicating means (unit) communicates using a communication interface corresponding to an instruction from the control apparatus, in a case where a user of the wireless communication terminal has consented.
<Tenth Mode>
The wireless communication terminal according to any one of the first to ninth modes, furthermore comprising a packet processing means (unit) for making a request to the control apparatus for a processing rule for processing a packet belonging to a prescribed communication flow, and processing the packet in accordance with the processing rule that is set by the control apparatus in response to the request; wherein the packet processing means (unit) receives a processing rule prescribing switching of a communication interface in accordance with a communication flow, from the control apparatus, and processes the packet in accordance with the processing rule.
<Eleventh Mode>
(See the communication system according to a second aspect described above.)
<Twelfth Mode>
The communication system according to the eleventh mode, wherein the communicating means (unit) of the wireless communication terminal activates a communication interface corresponding to the instructed wireless access system in accordance with the instruction from the control apparatus, and communicates using the activated communication interface.
<Thirteenth Mode>
The communication system according to the eleventh or twelfth mode, wherein the wireless communication terminal further comprises means (unit) for notifying the control apparatus of the status of the wireless communication terminal, which changes along with movement of the wireless communication terminal.
<Fourteenth Mode>
The communication system according to any one of the eleventh to thirteenth nodes, wherein the control apparatus comprises means (unit) for determining a wireless access system to which the wireless communication terminal connects, for each communication flow; and the wireless communication terminal further comprises means (unit) for switching a communication interface for each communication flow, based on an instruction transmitted from the control apparatus.
<Fifteenth Mode>
The communication system according to any one of the eleventh to fourteenth modes, wherein the wireless communication terminal further comprises means (unit) for stopping operation of at least one communication interface not used in communication, based on an instruction transmitted from the control apparatus.
<Sixteenth Mode>
The communication system according to any one of the eleventh to fifteenth modes, wherein the control apparatus further comprises means (unit) for transmitting information related to a connection apparatus for connecting to a determined wireless access system, to the wireless communication terminal; and the communicating means (unit) of the wireless communication terminal communicates via the connection apparatus by a communication interface corresponding to the instructed wireless access system.
<Seventeenth Mode>
The communication system according to any one of the eleventh to sixteenth modes, wherein the control apparatus further comprises means (unit) for determining a wireless access system based on information related to the location of a wireless communication terminal; the receiving means (unit) of the wireless communication terminal receives an instruction including a wireless access system determined by the control apparatus; and the communicating means (unit) of the wireless communication terminal communicates using a communication interface corresponding to the instructed wireless access system.
<Eighteenth Mode>
The communication system according to any one of the eleventh to seventeenth modes, wherein the control apparatus further comprises means (unit) for determining a wireless access system based on at least one of: movement history of the wireless communication terminal or communication history of the wireless communication terminal; the receiving means (unit) of the wireless communication terminal receives an instruction including the wireless access system determined by the control apparatus; and the communicating means (unit) of the wireless communication terminal communicates using a communication interface corresponding to the instructed wireless access system.
<Nineteenth Mode>
The communication system according to any one of the eleventh to eighteenth modes, wherein the communicating means (unit) of the wireless communication terminal uses a communication interface corresponding to an instruction from the control apparatus, in a case where a user has consented.

<Twentieth Mode>
The communication system according to any one of the eleventh to nineteenth modes, wherein the wireless communication terminal comprises a packet processing means (unit) for making a request to the control apparatus for a processing rule for processing a packet belonging to a prescribed communication flow, and processing the packet in accordance with the processing rule that is set by the control apparatus in response to the request; and receives a processing rule prescribing switching of a communication interface in accordance with a communication flow from the control apparatus, and processes the packet in accordance with the processing rule.

<Twenty-First Mode>
(See the control apparatus according to a third aspect described above.)

<Twenty-Second Mode>
The control apparatus according to the twenty-first mode, further comprising means (unit) for transmitting an instruction to activate a communication interface corresponding to the determined wireless access system, to the wireless communication terminal.

<Twenty-Third Mode>
The control apparatus according to the twenty-first or twenty-second mode, further comprising means (unit) for determining a wireless access system to which the wireless communication terminal connects, for each communication flow.

<Twenty-fourth Mode>
The control apparatus according to any one of the twenty-first to twenty-third modes, further comprising means (unit) for transmitting an instruction to the wireless communication terminal to stop operation of at least one communication interface corresponding to a wireless access system not used in communication.

<Twenty-Fifth Mode>
The control apparatus according to any one of the twenty-first to twenty-fourth modes, wherein the means (unit) for transmitting transmits information related to a connection apparatus for connecting to the determined wireless access system, to the wireless communication terminal.

<Twenty-Sixth Mode>
The control apparatus according to any one of the twenty-first to twenty-fifth modes, wherein the determining means (unit) determines a wireless access system to be used by a wireless communication terminal based on information related to the location of the wireless communication terminal.

<Twenty-Seventh Mode>
The control apparatus according to any one of the twenty-first to twenty-sixth modes, wherein the determining means (unit) determines a wireless access system to be used by the wireless communication terminal based on at least one of: movement history of the wireless communication terminal or communication history of the wireless communication terminal.

<Twenty-Eighth Mode>
The control apparatus according to any one of the twenty-first to twenty-seventh modes, wherein the transmitting means (unit) transmits the instruction to the wireless communication terminal in a case where a user of the wireless communication terminal has consented.

<Twenty-Ninth Mode>
The control apparatus according to any one of the twenty-first to twenty-eighth modes, wherein the control apparatus transmits a processing rule prescribing switching of a communication interface in accordance with a communication flow, to a wireless communication terminal having a packet processing means (unit) for making a request to the control apparatus for a processing rule for processing a packet belonging to a prescribed communication flow, and processing the packet in accordance with the processing rule that is set by the control apparatus in response to the request.

<Thirtieth Mode>
(See the communication method according to a fourth aspect described above.)

<Thirty-First Mode>
(See the program according to a fifth aspect described above.)

The respective disclosures of the Patent Literature and Non Patent Literature described above are hereby incorporated by reference into this application. The exemplary embodiments and examples may be changed and adjusted within the bounds of the entire disclosure (including claims) of the present invention and based on fundamental technological concepts thereof. Furthermore, a wide variety of combinations and selections of various disclosed elements (including respective elements of the respective claims, respective elements of the respective exemplary embodiments and examples, respective elements of the respective drawings, and the like) is possible within the scope of the claims of the present invention. That is, it is to be understood that the present invention includes every type of transformation and modification (variation) that a person skilled in the art can realize according to the entire disclosure including the scope of the claims and to technological concepts thereof.

REFERENCE SIGNS LIST 1 wireless communication terminal
2 control apparatus
3 network
4 RAT
4-1 UTRAN
4-2 to 4-4 WLAN
10 communication interface
11 control unit
12 communication unit
20 communication unit
21 control unit
22 policy DB
100 wireless communication terminal
101 application unit
102 protocol stack unit
103 packet forwarding function unit
104 port
105 communication interface
111 monitoring unit
112 notification unit
113 access management unit
130 communication unit
131 processing unit
132 access management unit
133 access management DB
134 processing rule management unit
135 processing rule DB
136 search unit
137 processing execution unit
200 control apparatus 201 node communication unit
202 control message processing unit
203 calculation unit
204 topology management unit
205 location management unit
206 policy DB
207 DB management unit
208 processing rule DB
209 packet forwarding function management unit
300 network
500 forwarding apparatus
600 OpenFlow Switch
601 Flow Table
700 OpenFlow Controller
701 Secure Channel

The invention claimed is:

1. A wireless communication terminal, comprising:
a plurality of communication interfaces each of which corresponds to at least one of a plurality of wireless access systems, wherein the plurality of communication interfaces comprises a first communication interface and a second communication interface;
wherein:
the wireless communication terminal receives an instruction from a prescribed control apparatus via the second communication interface, which is available to communicate with said a control apparatus that controls the wireless access systems to which the wireless communication terminal connects, said instruction including a wireless access system determined by said control apparatus based on a status of said wireless communication terminal, which changes along with movement of said wireless communication terminal; and
the wireless communication terminal communicates by using the first communication interface, the first communication interface corresponding to said instructed wireless access system.

2. The wireless communication terminal according to claim 1, wherein the wireless communication terminal activates a communication interface corresponding to said instructed wireless access system in accordance with an instruction from said control apparatus, and communicates using said activated communication interface.

3. The wireless communication terminal according to claim 1, wherein the wireless communication terminal notifies said control apparatus of the status of said wireless communication terminal, which changes along with movement of said wireless communication terminal.

4. The wireless communication terminal according to claim 1, wherein the wireless communication terminal switches a communication interface for each communication flow, based on an instruction transmitted from said control apparatus.

5. The wireless communication terminal according to claim 1, wherein the wireless communication terminal stops operation of at least one communication interface, based on an instruction of said control apparatus.

6. The wireless communication terminal according to claim 1, wherein
the wireless communication terminal receives information related to a connection apparatus for connecting by said wireless access system determined by said control apparatus, from said control apparatus; and
the wireless communication terminal communicates via said connection apparatus, by a communication interface corresponding to said instructed wireless access system.

7. The wireless communication terminal according to claim 1, wherein
the wireless communication terminal receives an instruction from said control apparatus, said instruction including a wireless access system determined by said control apparatus based on information related to the location of said wireless communication terminal, and
the wireless communication terminal communicates using a communication interface corresponding to said instructed wireless access system.

8. The wireless communication terminal according to claim 1, wherein the wireless communication terminal receives an instruction including a wireless access system determined based on at least one of: movement history of said wireless communication terminal or communication history of said wireless communication terminal.

9. The wireless communication terminal according to claim 1, wherein the wireless communication terminal communicates using a communication interface corresponding to an instruction from said control apparatus, in a case where a user of said wireless communication terminal has consented.

10. The wireless communication terminal according to claim 1, wherein:
the wireless communication terminal makes a request to said control apparatus for a packet handling operation for processing a packet belonging to a prescribed communication flow, and processing said packet in accordance with said packet handling operation that is set by said control apparatus in response to said request; and
receives a packet handling operation prescribing switching of a communication interface in accordance with a communication flow, from said control apparatus, and processes said packet in accordance with said packet handling operation.

11. A communication system, comprising:
a control apparatus that controls wireless access systems to which a wireless communication terminal connects; and
a plurality of communication interfaces each of which corresponds to at least one of said wireless access systems, wherein the plurality of communication interfaces comprises a first communication interface and a second communication interface, wherein
the wireless communication terminal receives an instruction from a prescribed control apparatus via the second communication interface, which is available to communicate with said control apparatus, said instruction including a wireless access system determined by said control apparatus based on a status of said wireless communication terminal, which changes along with movement of said wireless communication terminal; and wherein
the wireless communication terminal communicates by using the first communication interface, the first communication interface corresponding to said instructed wireless access system.

12. The communication system according to claim 11, wherein said wireless communication terminal activates a communication interface corresponding to said instructed wireless access system in accordance with said instruction from said control apparatus, and communicates using said activated communication interface.

13. The communication system according to claim 11, wherein said wireless communication terminal notifies said control apparatus of the status of said wireless communication terminal, which changes along with movement of said wireless communication terminal.

14. The communication system according to claim 11, wherein
said control apparatus determines a wireless access system to which said wireless communication terminal connects, for each communication flow; and
said wireless communication terminal switches a communication interface for each communication flow, based on an instruction transmitted from said control apparatus.

15. The communication system according to claim 11, wherein said wireless communication terminal stops operation of at least one communication interface not used in communication, based on an instruction transmitted from said control apparatus.

16. The communication system according to claim 11, wherein
said control apparatus transmits information related to a connection apparatus for connecting to a determined wireless access system, to said wireless communication terminal; and
said wireless communication terminal communicates via said connection apparatus, by a communication interface corresponding to said instructed wireless access system.

17. The communication system according to claim 11, wherein
said control apparatus determines a wireless access system based on information related to the location of a wireless communication terminal;
said wireless communication terminal receives an instruction including a wireless access system determined by said control apparatus; and
said wireless communication terminal communicates using a communication interface corresponding to said instructed wireless access system.

18. The communication system according to claim 11, wherein
said control apparatus determines a wireless access system based on at least one of: movement history of said wireless communication terminal or communication history of said wireless communication terminal;
said wireless communication terminal receives an instruction including said wireless access system determined by said control apparatus; and
said wireless communication terminal communicates using a communication interface corresponding to said instructed wireless access system.

19. The communication system according to claim 11, wherein said wireless communication terminal uses a communication interface corresponding to an instruction from said control apparatus, in a case where a user has consented.

20. The communication system according to claim 11, wherein said wireless communication terminal
makes a request to said control apparatus for a packet handling operation for processing a packet belonging to a prescribed communication flow, and processing said packet in accordance with said packet handling operation that is set by said control apparatus in response to said request; and
receives a packet handling operation prescribing switching of a communication interface in accordance with a communication flow from said control apparatus, and processes said packet in accordance with said packet handling operation.

21. A control apparatus comprising:
memory storing instructions; and a processor to execute the instructions to:
cause a receiver to receive a status of a wireless communication terminal, which changes along with movement of said wireless communication terminal; determine a wireless access system to which said wireless communication terminal connects using a first communication interface, based on the received status of said wireless communication terminal; and cause a transmitter to transmit an instruction including said determined wireless access system, to said wireless communication terminal, wherein said wireless communication terminal receives the instruction via a second communication interface.

22. The control apparatus according to claim 21, wherein the processor execute instructions to cause the transmitter to transmit an instruction to activate a communication interface corresponding to said determined wireless access system, to said wireless communication terminal.

23. The control apparatus according to claim 21, wherein the processor executes instructions to determine a wireless access system to which said wireless communication terminal connects, for each communication flow.

24. The control apparatus according to claim 21, wherein the processor executes instructions to cause the transmitter to transmit an instruction to said wireless communication terminal to stop operation of at least one communication interface corresponding to a wireless access system not used in communication terminal.

25. The control apparatus according to claim 21, wherein the processor executes instructions to cause the transmitter to transmit information related to a connection apparatus for connecting to said determined wireless access system, to said wireless communication terminal.

26. The control apparatus according to claim 21, wherein the processor executes instructions to determine a wireless access system to be used by a wireless communication terminal based on information related to the location of said wireless communication terminal.

27. The control apparatus according to claim 21, wherein the processor executes instructions to determine a wireless access system to be used by said wireless communication terminal based on at least one of: movement history of said wireless communication terminal or communication history of said wireless communication terminal.

28. The control apparatus according to claim 21, wherein the processor executes instructions to cause the transmitter to transmit said instruction to said wireless communication terminal in a case where a user of said wireless communication terminal has consented.

29. The control apparatus according to claim 21, wherein the processor executes instructions to cause the transmitter to transmit a packet handling operation prescribing switching of a communication interface in accordance with a communication flow, to a wireless communication terminal for making a request to said control apparatus for a packet handling operation for processing a packet belonging to a prescribed communication flow, and processing said packet in accordance with said packet handling operation that is set by said control apparatus in response to said request.

30. A communication method comprising:
providing a wireless communication terminal including a plurality of communication interfaces corresponding to at least one of a plurality of wireless access systems wherein the plurality of communication interfaces comprises a first communication interface and a second communication interface;

receiving, from a prescribed control apparatus via the second communication interface, an instruction including a wireless access system determined by said control apparatus based on a status of said wireless communication terminal, which changes along with movement of said wireless communication terminal, and communicating by using the first communication interface corresponding to said instructed wireless access system.

31. A non-transitory computer readable medium containing program instructions executable on a wireless communication terminal, for causing the wireless communication terminal to perform a process comprising:

implementing a plurality of communication interfaces corresponding to at least one of a plurality of wireless access systems wherein the plurality of communication interfaces comprises a first communication interface and a second communication interface;

receiving, from a prescribed control apparatus via the second communication interface, an instruction including a wireless access system determined by said control apparatus based on a status of said wireless communication terminal, which changes along with movement of said wireless communication terminal, and communicating by using the first communication interface corresponding to said instructed wireless access system.

* * * * *